US008156381B2

(12) United States Patent
Tamura et al.

(10) Patent No.: US 8,156,381 B2
(45) Date of Patent: Apr. 10, 2012

(54) STORAGE MANAGEMENT APPARATUS AND STORAGE SYSTEM

(75) Inventors: Masahisa Tamura, Kawasaki (JP);
Yasuo Noguchi, Kawasaki (JP);
Kazutaka Ogihara, Kawasaki (JP);
Yoshihiro Tsuchiya, Kawasaki (JP);
Tetsutaro Maruyama, Kawasaki (JP);
Riichiro Take, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 229 days.

(21) Appl. No.: 12/331,662

(22) Filed: Dec. 10, 2008

(65) Prior Publication Data

US 2009/0164844 A1 Jun. 25, 2009

(30) Foreign Application Priority Data

Dec. 20, 2007 (JP) ................................ 2007-328396

(51) Int. Cl.
*G06F 11/00* (2006.01)
(52) U.S. Cl. ............ 714/42; 714/6.1; 714/6.13; 714/6.2; 714/6.21; 714/6.22; 714/21; 714/47.1; 714/47.2
(58) Field of Classification Search .................. 714/6, 8, 714/21, 42, 6.1, 6.13, 6.2, 6.21, 6.22, 47.1, 714/47.2
See application file for complete search history.

(56) References Cited

U.S. PATENT DOCUMENTS

| 5,613,066 | A | | 3/1997 | Matsushima et al. | |
|---|---|---|---|---|---|
| 5,632,012 | A | * | 5/1997 | Belsan et al. | 714/6 |
| 5,953,352 | A | * | 9/1999 | Meyer | 714/820 |
| 6,484,269 | B1 | * | 11/2002 | Kopylovitz | 714/5 |
| 7,137,038 | B2 | * | 11/2006 | New et al. | 714/42 |
| 7,149,935 | B1 | * | 12/2006 | Morris et al. | 714/54 |
| 7,529,982 | B1 | * | 5/2009 | Coatney et al. | 714/54 |
| 2005/0033800 | A1 | | 2/2005 | Kavuri | |
| 2005/0119996 | A1 | | 6/2005 | Ohata et al. | |
| 2005/0235109 | A1 | | 10/2005 | Ogihara | |
| 2008/0068899 | A1 | | 3/2008 | Ogihara | |
| 2009/0070647 | A1 | * | 3/2009 | Allison et al. | 714/746 |

FOREIGN PATENT DOCUMENTS

| JP | A 7-104947 | 4/1995 |
|---|---|---|
| JP | A 7-210325 | 8/1995 |
| JP | A 9-62461 | 3/1997 |
| JP | A 9-270794 | 10/1997 |
| JP | A 2004-206495 | 7/2004 |
| JP | A 2005-157933 | 6/2005 |

OTHER PUBLICATIONS

The American Heritage college dictionary, 2004, Houghton Mifflin Company, Fourth Edition, p. 486.*
European Search Report issued in corresponding EP App. No. 08171536.9, dated Sep. 1, 2010.

* cited by examiner

*Primary Examiner* — Charles Ehne
(74) *Attorney, Agent, or Firm* — Greer, Burns & Crain, Ltd.

(57) ABSTRACT

A storage management apparatus manages a plurality of storage apparatuses connected to each other over a network in a storage system that distributes data among the storage apparatuses and stores the data therein. The storage management apparatus has a patrol process executing unit configured to execute a patrol process to confirm whether a storage area of each storage apparatus operates normally and a patrol flow controlling unit configured to control a patrol flow indicating the speed of the patrol process executed by the patrol process executing unit.

7 Claims, 15 Drawing Sheets

FIG. 7

PATROL PERFORMANCE TABLE

| APPARATUS | SEQUENTIAL | | RANDOM | |
|---|---|---|---|---|
| | READING PROCESS | WRITING PROCESS | READING PROCESS | WRITING PROCESS |
| STORAGE APPARATUS A | 50 MB/S | 50 MB/S | 500 IOPS | 500 IOPS |
| STORAGE APPARATUS B | 30 MB/S | 10 MB/S | 100 IOPS | 10 IOPS |
| ⋮ | ⋮ | ⋮ | ⋮ | ⋮ |

| APPARATUS | SUBAREA | SEQUENTIAL | | RANDOM | |
|---|---|---|---|---|---|
| | | READING PROCESS | WRITING PROCESS | READING PROCESS | WRITING PROCESS |
| STORAGE APPARATUS A | 0 TO 100 [BLOCK] | 50 MB/S | 50 MB/S | 500 IOPS | 500 IOPS |
| | 100 TO 200 [BLOCK] | 30 MB/S | 10 MB/S | 100 IOPS | 10 IOPS |
| | 200 TO 1000 [BLOCK] | 30 MB/S | 10 MB/S | 10 IOPS | 10 IOPS |
| ... | ... | ... | ... | ... | ... |

PATROL PERFORMANCE TABLE 192

FIG. 9

PATROL PERFORMANCE TABLE 193

| APPARATUS | TARGET TIME PERIOD | MEASUREMENT DATE | SEQUENTIAL | | RANDOM | |
| --- | --- | --- | --- | --- | --- | --- |
| | | | READING PROCESS | WRITING PROCESS | READING PROCESS | WRITING PROCESS |
| STORAGE APPARATUS A | 0 TO 3 | 10/1 | 50 MB/S | 50 MB/S | 500 IOPS | 500 IOPS |
| | 3 TO 6 | 9/30 | 50 MB/S | 50 MB/S | 500 IOPS | 500 IOPS |
| | 6 TO 9 | 9/29 | 50 MB/S | 50 MB/S | 200 IOPS | 100 IOPS |
| | 9 TO 12 | 10/1 | 30 MB/S | 10 MB/S | 100 IOPS | 10 IOPS |
| | 12 TO 15 | 9/30 | 10 MB/S | 10 MB/S | 10 IOPS | 10 IOPS |
| | 15 TO 19 | 9/29 | 30 MB/S | 10 MB/S | 100 IOPS | 10 IOPS |
| | 19 TO 21 | 9/30 | 30 MB/S | 10 MB/S | 100 IOPS | 10 IOPS |
| | 21 TO 24 | 9/29 | 30 MB/S | 30 MB/S | 200 IOPS | 10 IOPS |
| ... | ... | ... | ... | ... | ... | ... |

193a  193c  193d  193e  193f  193g  193h

STORAGE MANAGEMENT APPARATUS AND STORAGE SYSTEM

CROSS REFERENCES TO RELATED APPLICATIONS

This application is based upon and claims the benefit of priority from prior Japanese Patent Application No. 2007-328396 filed on Dec. 20, 2007, the entire contents of which are incorporated herein by reference.

BACKGROUND OF THE INVENTION

1. Field of the Invention

The present invention relates to a storage management apparatus performing distributed management of data among multiple storage nodes, a storage medium storing a storage management program, and a storage system.

2. Description of the Related Art

In order to monitor the performance of a storage system or another computer system, for example, Japanese Unexamined Patent Application Publication No. 2005-157933 discloses a technology for automatically adjusting the range over which subsequent information is collected and the degree to which the subsequent information is collected on the basis of performance information collected from components in a storage network.

Japanese Unexamined Patent Application Publication No. 09-270794 discloses a network management apparatus automatically adjusting intervals at which monitor traffic occurs in accordance with the load on network nodes.

Japanese Unexamined Patent Application Publication No. 2004-206495 discloses a management system identifying monitor items to be acquired on the basis of the operation performance of each monitor item of a computer to be managed.

SUMMARY OF THE INVENTION

Accordingly, it is an object of the present invention to provide a storage management apparatus managing a plurality of storage apparatuses connected to each other over a network in a storage system that distributes data among the storage apparatuses and stores the data therein. The storage management apparatus includes a patrol process executing unit configured to execute a patrol process to confirm whether a storage area of each storage apparatus operates normally and a patrol flow controlling unit configured to control a patrol flow indicating the speed of the patrol process executed by the patrol process executing unit.

Additional objects and advantages of the invention will be set forth in part in the description which follows, and in part will be obvious from the description or may be learned by practice of the invention. The object and advantageous of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

FIG. 7 shows an example of the data structure of a patrol performance table in which the results of measurement of the patrol performance for every storage apparatus are stored;

FIG. 8 shows an example of the data structure of a patrol performance table in which the results of measurement of the patrol performance of the storage apparatus for every divided subarea are stored;

FIG. 9 shows an example of the data structure of a patrol performance table in which the results of measurement of the patrol performance of the storage apparatus for every time period are stored;

DESCRIPTION OF THE PREFERRED EMBODIMENTS

Figure 1:
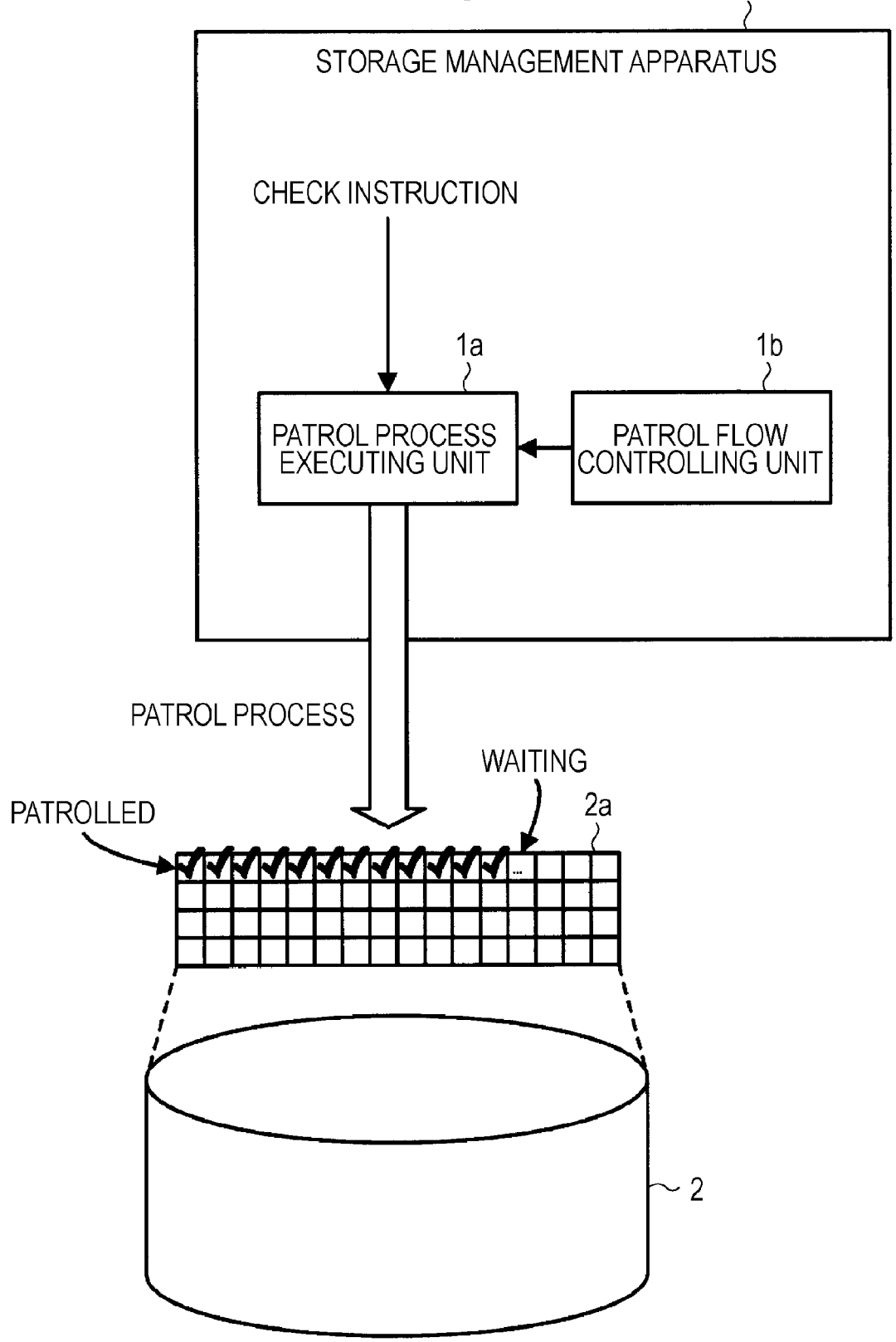
FIG. 1 is a diagram for schematically illustrating a storage system according to an embodiment of the present invention.

Data processing using computers becomes popular and storage technologies for storing and utilizing data are quite important. Redundant Arrays of Independent Disks (RAID) have been generally used as a storage technology in related art to increase the speed of data access and to increase the reliability of data storage. In the RAID, data that is divided and reproduced as needed is distributed among multiple storage apparatuses and is arranged therein. The distribution of the load among the multiple storage apparatuses causes the increase in the speed of the data access and the redundancy of the data causes the increase in the reliability of the data storage.

Distributed storage systems utilizing the concept of the RAID have been built in recent years in order to further increase the speed of the data access and the reliability of the data storage. A typical distributed storage system includes multiple storage nodes and a network over which the storage nodes are connected. Each storage node manages a storage apparatus that is provided therein or that is provided outside and is associated with the storage node and has a network communication function. The distributed storage system distributes data among the multiple storage nodes and stores the data therein to realize higher processing speed and higher reliability of the entire system.

In order to diagnose the normality of each storage apparatus in such a storage system, it is generally confirmed whether the storage apparatus is in operation (so-called keep-alive confirmation). Since the keep-alive confirmation can be performed in a relatively short time and has a lower processing load, there is an advantage of a relatively small effect on access during normal operation of the system.

The diagnosis is performed in the related art in order to monitor the performance of the storage system and other computer systems. However, with only the diagnosis of the normal operation as in the related art, it is possible to confirm the operation of the storage apparatus itself but it is not possible to detect any failure occurring only in a specific area in the storage apparatus.

In particular, when a redundant configuration is adopted between the storage apparatuses, such as a case where the storage apparatuses are configured according to RAID5, it is possible to recover from failure that is detected in one area. However, if failures concurrently occur in two areas associated with each other by the redundant configuration, it is not possible to recover data missed by the failures. Accordingly, it is important to diagnose occurrences of failures across the entire area of the storage apparatus, in addition to the diagnosis of the operation of the storage apparatus.

However, the diagnosis of the entire storage area of the storage apparatus puts a heavy load on the storage system and it takes a long time to complete the diagnosis. Accordingly, the diagnosis of the storage area of the storage apparatus has a problem in that the effect on access during normal operation is too large to ignore it.

In addition, storage apparatuses of various types can exist in the distributed storage system. In such a case, it can take different times to perform the diagnosis of the same content depending on the types of the storage apparatuses or the diagnosis of the same content can have different effects on access by the normal operation depending on the types of the storage apparatuses. Accordingly, it is difficult to estimate the effect of the diagnosis of the entire area of the storage apparatus on the normal operation.

Furthermore, a redundant configuration can be adopted between the storage nodes in the distributed storage system. It is necessary to determine whether the data in each storage node in the redundant configuration correctly holds the redundant configuration in order to diagnose the normality of the data. The distributed storage system can have a configuration in which storage nodes of various configurations exist. In such a case, as in the storage apparatus, it can take different times to perform the diagnosis of the same content depending on the configurations of the storage nodes or the diagnosis of the same content can have different effects on access during normal operation depending on the configurations of the storage nodes. Accordingly, it is difficult to estimate the effect of the diagnosis of the entire area of the storage apparatus on normal operation.

With the technologies disclosed in Japanese Unexamined Patent Application Publication No. 2005-157933, Japanese Unexamined Patent Application Publication No. 09-270794, and Japanese Unexamined Patent Application Publication No. 2004-206495, it is possible to collect a variety of performance information about the system, such as the frequencies of access to the computers in the system. However, just the collection of the variety of performance information does not allow abnormality of each area in the storage apparatus to be diagnosed, and does not allow the load of the diagnosis to be directly reduced.

In order to resolve the above problems, it is desirable to provide a storage management apparatus capable of increasing the reliability of a storage system while reducing the effect of the load based on execution of a patrol process on access to storage apparatuses.

Embodiments of the present invention will herein be described in detail with reference to the attached drawings.

A system in which various storage nodes managing various storage apparatuses are connected to each other over a network is called a multi-node storage system. In such a multi-node storage system, a storage management apparatus according to an embodiment of the present invention autonomously adjusts and executes a patrol process to diagnose normal readout and writing of data from and into each storage area in each storage apparatus.

FIG. 1 is a diagram for schematically illustrating a storage system according to an embodiment of the present invention. The storage system shown in FIG. 1 distributes data among multiple storage apparatuses connected to each other over a network and stores the data therein. The storage system includes a storage management apparatus 1 and a storage apparatus 2.

The storage management apparatus 1 manages the storage apparatus 2. The storage management apparatus 1 includes a patrol process executing unit 1a and a patrol flow controlling unit 1b in order to manage the storage apparatus 2.

The patrol process executing unit 1a executes the patrol process to confirm whether a storage area 2a of the storage apparatus 2 is operating normally. The data in the storage apparatus 2 is stored in the storage area 2a. Specifically, in the patrol process, the patrol process executing unit 1a sequentially repeats readout of data stored in the storage area 2a of the storage apparatus 2 and writing of the readout data into sub-areas in which the data was stored for every sub-area resulting from division of the storage area 2a.

The patrol flow controlling unit 1b controls a patrol flow indicating the speed of the patrol process executed by the patrol process executing unit 1a. Specifically, in the control of the patrol flow, the patrol flow controlling unit 1b monitors the patrol flow in the patrol process executed by the patrol process executing unit 1a and causes the patrol process executing unit 1a to be in a standby mode of the execution of the patrol process if the patrol flow is too high.

In the storage management apparatus 1 described above, the patrol process executing unit 1a confirms whether the storage area 2a of the storage apparatus 2 operates normally and the patrol flow controlling unit 1b controls the speed of the patrol process executed by the patrol process executing unit 1a.

Accordingly, it is possible to increase the reliability of the storage system while reducing the effect of the load based on the execution of the patrol process on access to the storage apparatus.

A storage system according to an embodiment of the present invention will now be described with reference to the attached drawings.

Figure 2:
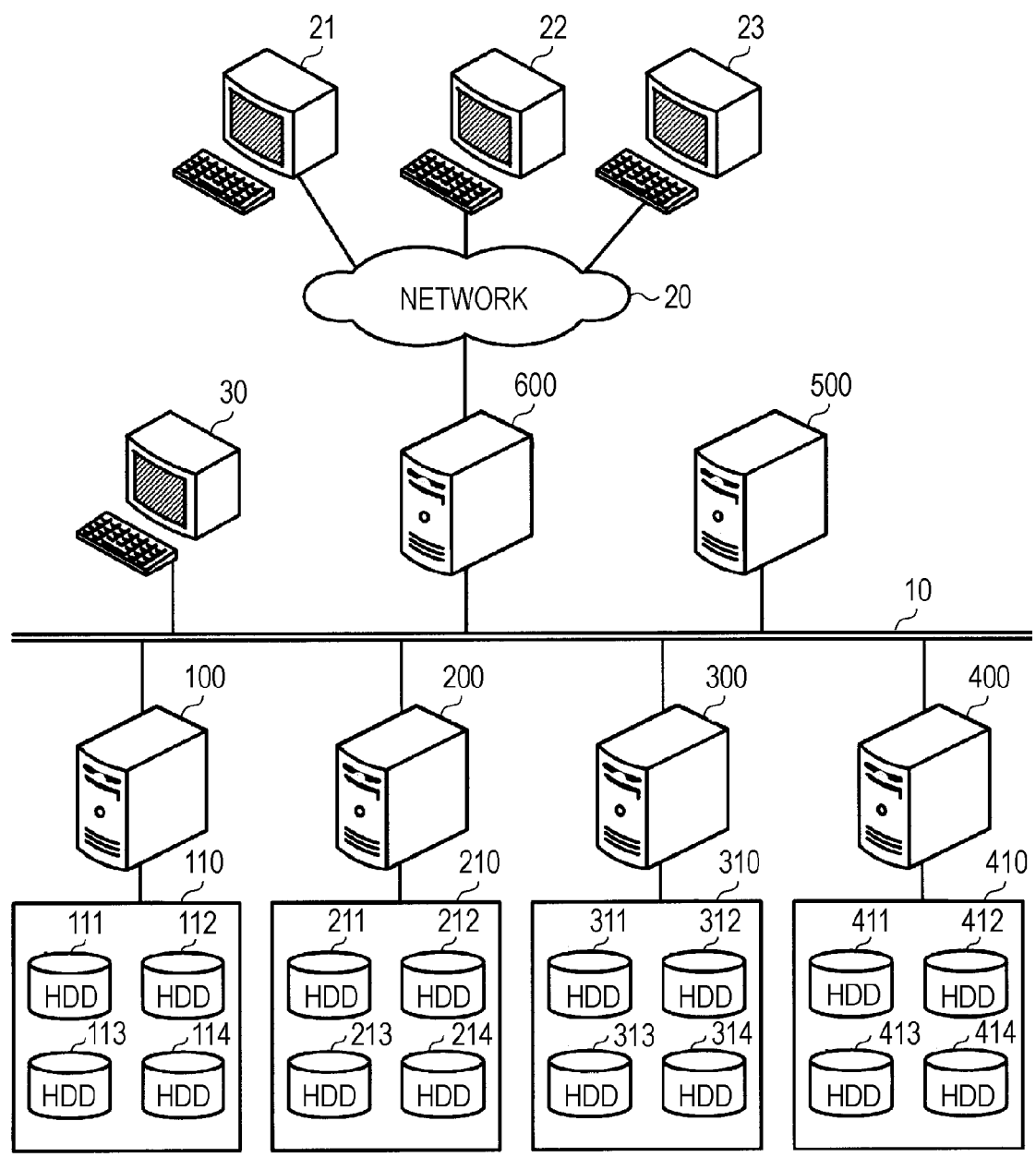
FIG. 2 is a block diagram showing an example of the configuration of a storage system according to an embodiment of the present invention.

FIG. 2 is a block diagram showing an example of the configuration of a storage system. The storage system shown in FIG. 2 distributes data among multiple storage apparatuses connected to each other over a network and stores the data therein. The storage system according to the embodiment of the present invention includes storage nodes 100, 200, 300, and 400, a control node 500, an access node 600, and a management node 30, which are connected to each other over a network 10. Terminal apparatuses 21, 22, and 23 are connected to the access node 600 over a network 20.

Storage apparatuses 110, 210, 310, and 410 are connected to the storage nodes 100, 200, 300, and 400, respectively. The storage nodes 100, 200, 300, and 400 manage data stored in the storage apparatuses 110, 210, 310, and 410 to which the storage nodes 100, 200, 300, and 400 are connected, respectively, and supply the managed data to the access node 600 over the network 10. The storage nodes 100, 200, 300, and 400 manage the data with redundancy. In other words, data of the same content is managed by at least two storage nodes.

The storage apparatus 110 has hard disk drives (HDDs) 111, 112, 113, and 114 installed therein. The storage apparatus 210 has HDDs 211, 212, 213, and 214 installed therein. The storage apparatus 310 has HDDs 311, 312, 313, and 314 installed therein. The storage apparatus 410 has HDDs 411, 412, 413, and 414 installed therein. The storage apparatuses 110, 210, 310, and 410 configure a RAID system using the multiple included HDDs. According to the present embodiment, the storage apparatuses 110, 210, 310, and 410 provide a disk management service according to the RAID5.

The storage apparatuses 110, 210, 310, and 410 may be configured according to another RAID, instead of the RAID5, or may configure disk arrays by using a technology other than the RAID. Alternatively, the storage apparatuses 110, 210, 310, and 410 may be configured by a single hard disk without using the disk arrays or may use another storage device.

The storage nodes 100, 200, 300, and 400 manage data stored in the storage apparatuses 110, 210, 310, and 410 to which the storage nodes 100, 200, 300, and 400 are connected, respectively, and supply the managed data to the terminal apparatuses 21, 22, and 23 over the network 10. The storage nodes 100, 200, 300, and 400 manage the data with redundancy. In other words, data of the same content is managed by at least two storage nodes.

In addition, the storage nodes 100, 200, 300, and 400 check for consistency of duplexed data (mirrored data) in the patrol process. The storage nodes 100, 200, 300, and 400 may check the consistency of the data on the basis of individual determinations or may check the consistency of the data in response to external instructions. According to the present embodiment, each of the storage nodes 100, 200, 300, and 400 autonomously checks the consistency of the duplexed data.

In the check of the consistency of the duplexed data in the patrol process, the storage nodes holding the duplexed data communicate with each other to check the consistency of the redundant data. If a failure is detected in the data managed by one of the storage nodes holding the duplexed data, the corresponding data held by the other storage node is used to recover the data in which the failure is detected.

The control node 500 manages the storage nodes 100, 200, 300, and 400. Specifically, the control node 500 holds a logical volume indicating how data is arranged. The control node 500 acquires information about the management of the data from the storage nodes 100, 200, 300, and 400 and updates the logical volume, if needed. If the logical volume is updated, the control node 500 notifies the storage node affected by the update of the logical volume of the content of the update. The logical volume will be described in detail below.

The access node 600 provides an information processing service, using the data managed by the storage nodes 100, 200, 300, and 400, to the terminal apparatuses 21, 22, and 23. Specifically, the access node 600 executes a certain program in response to a request from any of the terminal apparatuses 21, 22, and 23 and accesses the terminal apparatus 21, 22, or 23, as needed. Here, the access node 600 acquires the logical volume from the control node 500 and identifies the storage node to be accessed on the basis of the acquired logical volume.

The management node 30 is a terminal apparatus operated by a manager of the distributed storage system. The manager of the distributed storage system operates the management node 30 to access the storage node 100, 200, 300, and 400, the control node 500, and the access node 600 and makes various settings necessary for the operation.

The terminal apparatuses 21, 22, and 23 are computers operated by users of the storage system. The users of the storage system operate the terminal apparatuses 21, 22, and 23 to access the storage node 100. The storage node 100 reads out or writes data stored in the storage apparatus 110 in response to requests from the users.

The hardware configurations of the storage nodes 100, 200, 300, and 400, the control node 500, the access node 600, the terminal apparatuses 21, 22, and 23, and the management node 30 will now be described.

Figure 3:
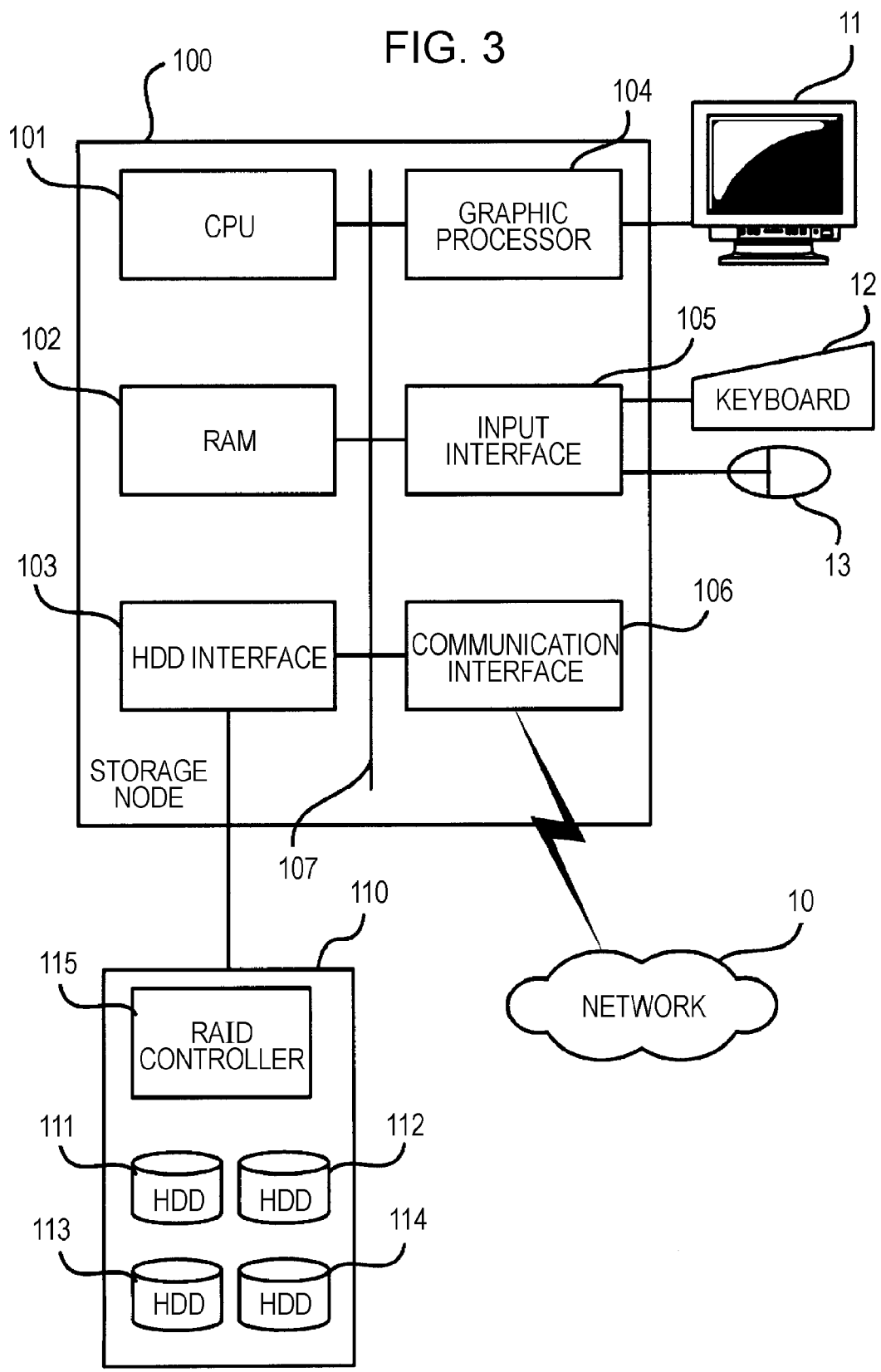
FIG. 3 is a block diagram showing an example of the hardware configuration of a storage node.

FIG. 3 is a block diagram showing an example of the hardware configuration of the storage node 100. A central processing unit (CPU) 101 controls the entire storage node 100. A random access memory (RAM) 102, an HDD interface 103, a graphic processor 104, an input interface 105, and a communication interface 106 are connected to the CPU 101 via a bus 107.

At least of part of the programs in an operating system (OS) and application programs executed by the CPU 101 are temporarily stored in the RAM 102. A variety of data necessary for the processing by the CPU 101 is also stored in the RAM 102.

The storage apparatus 110 is connected to the HDD interface 103. The HDD interface 103 communicates with a RAID controller 115 included in the storage apparatus 110 to input and output data in and from the storage apparatus 110. The RAID controller 115 in the storage apparatus 110 can perform functions of RAID0 to RAID5, and collectively manages the multiple HDDs 111 to 114 as a one hard disk.

A monitor 11 is connected to the graphic processor 104. The graphic processor 104 displays an image on the screen of the monitor 11 in response to an instruction from the CPU 101. A keyboard 12 and a mouse 13 are connected to the input interface 105. The input interface 105 transmits a signal transmitted from the keyboard 12 or the mouse 13 to the CPU 101 through the bus 107.

The communication interface 106 is connected to the network 10. The communication interface 106 transmits and receives data to and from another computer over the network 10.

The processing function of the present embodiment can be realized with the above hardware configuration. Although the configuration of only the storage node 100 and the storage apparatus 110 is shown in FIG. 3, the remaining storage node 200, 300, and 400 and the remaining storage apparatus 210, 310, and 410 can be realized with hardware configurations similar to the one shown in FIG. 3.

In addition, the control node 500, the access node 600, and the terminal apparatuses 21, 22, and 23 can be realized with hardware configurations similar to the hardware configuration of the combination of the storage node 100 and the storage apparatus 110. However, the control node 500, the access node 600, and the terminal apparatuses 21, 22, and 23 may not configure the RAID system as in the storage apparatus 110. In each of the control node 500, the access node 600, and the terminal apparatuses 21, 22, and 23, a single HDD may be connected to an HDD controller.

As shown in FIG. 2, the multiple storage nodes 100, 200, 300, and 400 are connected to the network 10 and each of the storage nodes 100, 200, 300, and 400 communicates with the remaining storage nodes. This distributed storage system functions as a virtual volume (hereinafter referred to as a logical volume) for the terminal apparatuses 21, 22, and 23.

Figure 4:
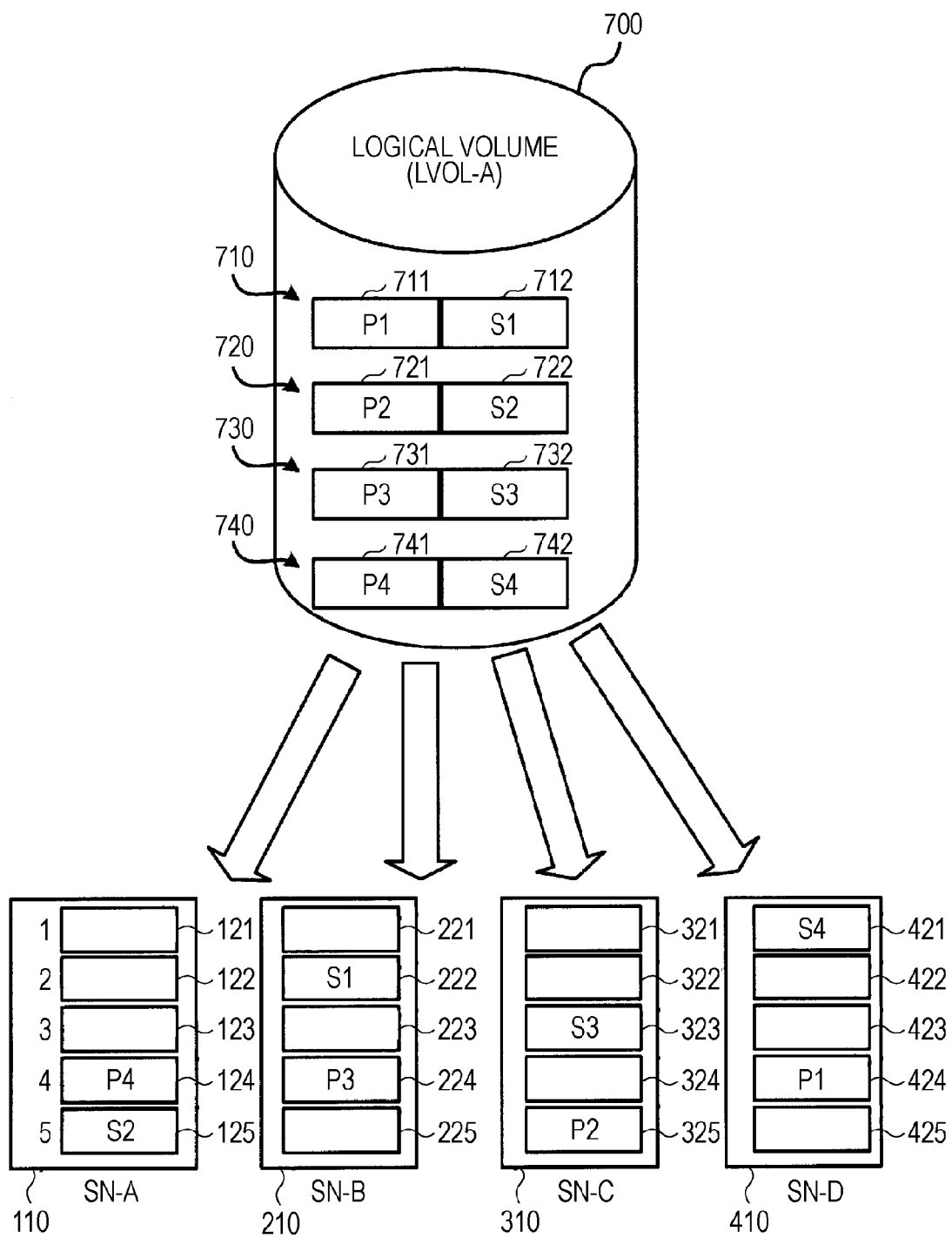
FIG. 4 illustrates an example of the data structure of a logical volume.

FIG. 4 illustrates an example of the data structure of a logical volume. An identifier "LVOL-A" (logical volume identifier) is assigned to a logical volume 700. Node identifiers "SN-A", "SN-B", "SN-C", and "SN-D" are assigned to the four storage apparatuses 110, 210, 310, and 401 connected to each other over the network. The node identifiers "SN-A", "SN-B", "SN-C", and "SN-D" are used for identifying the storage nodes managing the storage apparatuses.

A logical disk according to RAID5 is configured in each of the storage apparatuses 110, 210, 310, and 401 of the storage nodes 100, 200, 300, and 400, respectively. The logical disk is divided into five slices that are managed in the individual storage nodes.

In the example shown in FIG. 4, the storage area of the storage apparatus 110 is divided into five slices 121 to 125. The storage area of the storage apparatus 210 is divided into five slices 221 to 225. The storage area of the storage apparatus 310 is divided into five slices 321 to 325. The storage area of the storage apparatus 410 is divided into five slices 421 to 425.

The logical volume 700 is composed of segments 710, 720, 730, and 740. The storage capacity of each of the segments 710, 720, 730, and 740 is equal to the storage capacity of each slice, which is a management unit in the storage apparatuses 110, 210, 310, and 410. For example, if the storage capacity of one slice is equal to one gigabyte, the storage capacity of one segment is also equal to one gigabyte. The storage capacity of the logical volume 700 is an integral multiple of the storage capacity of one segment. If the storage capacity of one segment is equal to one gigabyte, the storage capacity of the logical volume 700 is equal to four gigabytes.

The segments 710, 720, 730, and 740 are composed of pairs of primary slices 711, 721, 731, and 741 and secondary slices 712, 722, 732, 742, respectively. The slices belonging to the same segment belong to different storage nodes. A flag is set in the area in which each slice is managed, in addition to the logical volume identifier, information about the segment, and information about the slices in the same segment. A value representing the primary or the secondary is stored in the flag.

In the example shown in FIG. 4, the identifier of each slice is represented by a pair of an alphabet "P" or "S" and a numeric character. The "P" denotes the primary slice and the "S" denotes the secondary slice. The numeric character following the alphabet denotes the number of the segment to which the slice belongs. For example, the primary slice of the first segment 710 is denoted by "P1" and the secondary slice thereof is denoted by "S1".

Each of the primary slices and the secondary slices in the logical volume 700 having the above structure is associated with any of the slices in the storage apparatuses 110, 210, 310, and 410. For example, the primary slice 711 in the segment 710 is associated with the slice 424 in the storage apparatus 410 and the secondary slice 712 in the segment 710 is associated with the slice 222 in the storage apparatus 210.

Each of the storage apparatuses 110, 210, 310, and 410 stores data about the primary and/or secondary slices corresponding to the slices included in the storage apparatuses 110, 210, 310, and 410.

The module configuration of the storage nodes 100, 200, 300, and 400 will now be described.

Figure 5:
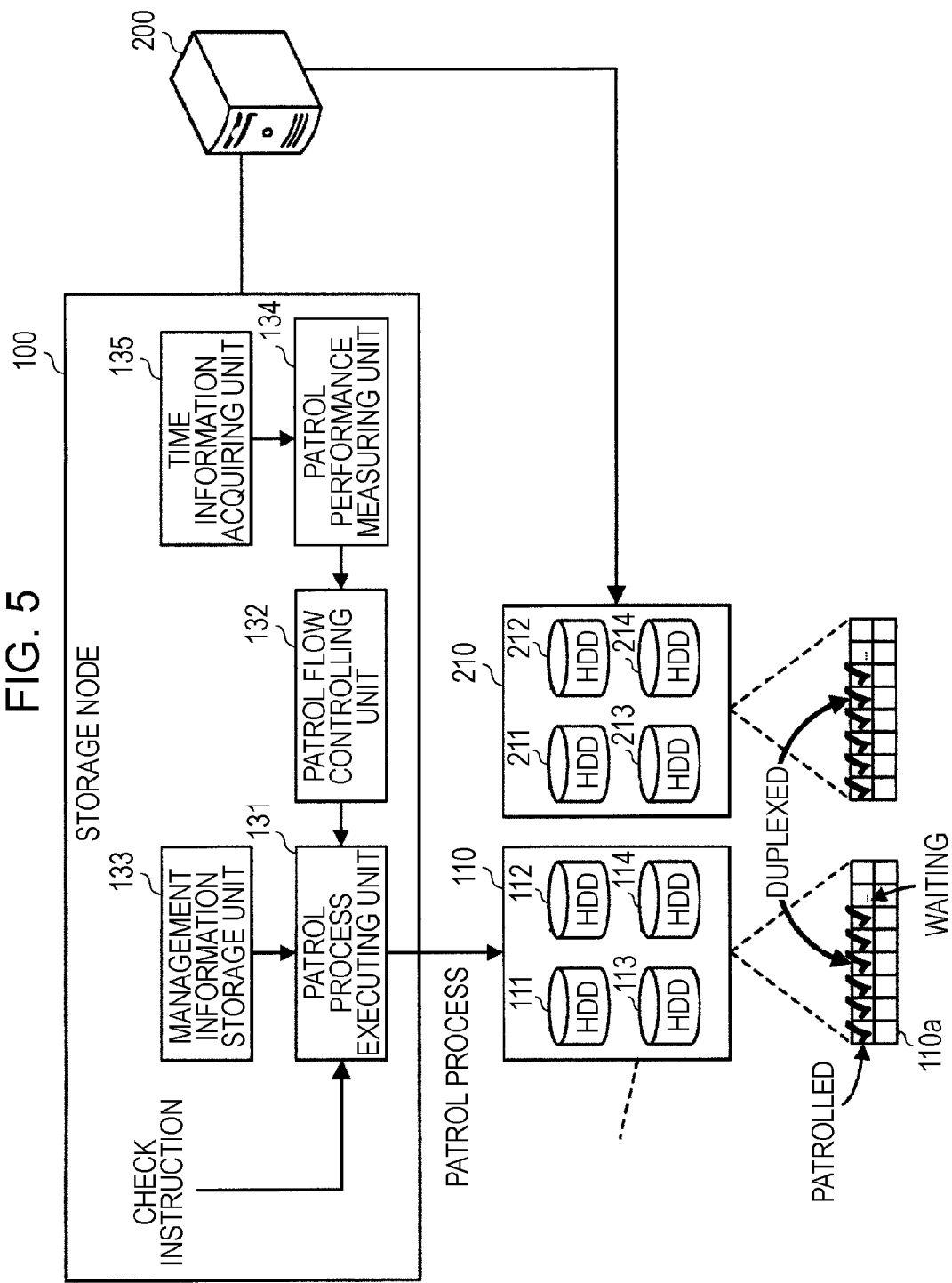
FIG. 5 is a block diagram showing an example of the functional configuration of the storage node.

FIG. 5 is a block diagram showing an example of the functional configuration of the storage node 100. Although the module configuration of the storage node 100 is shown in FIG. 5, the remaining storage nodes 200, 300, and 400 can be realized with module configurations similar to the module configuration of the storage node 100.

The storage node 100 manages the storage apparatus 110. The storage node 100 includes a patrol process executing unit 131, a patrol flow controlling unit 132, a management information storage unit 133, a patrol performance measuring unit 134, and a time information acquiring unit 135 in order to manage the storage apparatus 110. Similarly, the storage node 200 manages the storage apparatus 210. The storage node 200 performs functions similar to those of the storage node 100 in order to manage the storage apparatus 210.

It is assumed here that the storage apparatus 110 is duplexed (mirrored) with the storage apparatus 210. Specifically, the data stored in the storage apparatus 110 has redundant data that has the same content and that is stored in the storage apparatus 210. The data in the storage apparatus 110 is backed up by the redundant data in the storage apparatus 210 in the above manner.

The patrol process executing unit 131 executes the patrol process to confirm whether a storage area 110a of the storage apparatus 110 operates normally. Specifically, the patrol process executing unit 131 reads out data stored in the storage area 110a of the storage apparatus 110 to determine whether the readout data is normal in the patrol process. The data in the storage apparatus 110 is stored in the storage area 110a.

In addition, the patrol process executing unit 131 executes a redundant patrol process to confirm whether the redundant configuration of the data stored in the storage area 110a of the storage apparatus 110 is correctly held. Specifically, the patrol process executing unit 131 refers to management information stored in the management information storage unit 133 to identify the redundant data having the same content as that of the data stored in the storage apparatus 110 from the redundant data stored in the storage apparatus 210. Next, the patrol process executing unit 131 reads out the data stored in the storage apparatus 110 and the identified redundant data stored in the storage apparatus 210. Then, the patrol process executing unit 131 compares the readout data with the redundant data to confirm whether the readout data coincides with the redundant data.

The patrol process executing unit 131 executes the patrol process and the redundant patrol process for every execution unit area. The execution unit areas result from division of measurement unit areas in the storage area 110a of the storage apparatus 110.

Furthermore, in the patrol process, the patrol process executing unit 131 overwrites the redundant data having the same content as that of the data that is stored in the storage apparatus 210 duplexed (mirrored) with the storage apparatus 110 on the storage area 110a of the storage apparatus 110. Specifically, the patrol process executing unit 131 refers to the management information stored in the management information storage unit 133 to identify the redundant data having the same content as that of the data stored in the storage apparatus 110. Next, the patrol process executing unit 131 reads out the identified redundant data that has the same content as that of the data stored in the storage apparatus 110 and that is stored in the storage apparatus 210. Then, the patrol process executing unit 131 overwrites the readout redundant data on the storage area 110a of the data in the storage apparatus 110.

The patrol flow controlling unit 132 controls the patrol flow indicating the speed of the patrol process and the redundant patrol process executed by the patrol process executing unit 131. Specifically, the patrol flow controlling unit 132 determines a patrol flow setting value based on a patrol performance measured by the patrol performance measuring unit 134 and controls the patrol flow so as not to exceed the determined patrol flow setting value. The patrol flow controlling unit 132 controls the patrol flow of the patrol process for every execution unit area. The execution unit areas result from division of the storage area of the storage apparatus 110 into units in which the patrol process is executed.

The patrol flow controlling unit 132 may control the patrol flow for every time period. In this case, the patrol flow controlling unit 132 selects the patrol performance corresponding to the time period to which the current time belongs from the patrol performances held by the patrol performance measuring unit 134 on the basis of the current time indicated by time information acquired by the time information acquiring unit 135. Next, the patrol flow controlling unit 132 determines the patrol flow setting value based on the selected patrol performance. Then, the patrol flow controlling unit 132 controls the patrol flow so as not to exceed the determined patrol flow setting value.

The management information storage unit 133 stores the management information used for associating the storage apparatus 110 with the storage apparatus 210, which stores the redundant data that has the same content as that of the data stored in the storage apparatus 110. The storage node 100 identifies the redundant data of the data stored in the storage node 100 and the storage apparatus in which the redundant data is stored on the basis of the management information.

The patrol performance measuring unit 134 measures the patrol performance indicating the processing performance of the reading process and the writing process in the storage apparatus 110. The patrol performance measuring unit 134 measures the patrol performance for every measurement unit area. The measurement unit areas result from the division of the storage area 110a of the storage apparatus 110.

The patrol performance measuring unit 134 holds the patrol performances that are measured for every time period to which the time indicated by the time information acquired by the time information acquiring unit 135 belongs.

The time information acquiring unit 135 acquires the time information indicating the current time. The time information is generated by a timer in the CPU 101 in the storage node 100. However, the time information need not be generated by the timer and may be acquired from a network clock connected to the network 10 or another node.

In the storage node 100 having the above functional configuration, the patrol process executing unit 131 confirms whether the storage area of the storage apparatus 110 operates normally. Here, the speed of the patrol process executed by the patrol process executing unit 131 is controlled by the patrol flow controlling unit 132. As a result, the load on the storage system caused by the patrol process can be controlled to minimize the effect of the patrol process on the storage system.

The measurement of the patrol performances according to the present embodiment will now be described.

Figure 6:
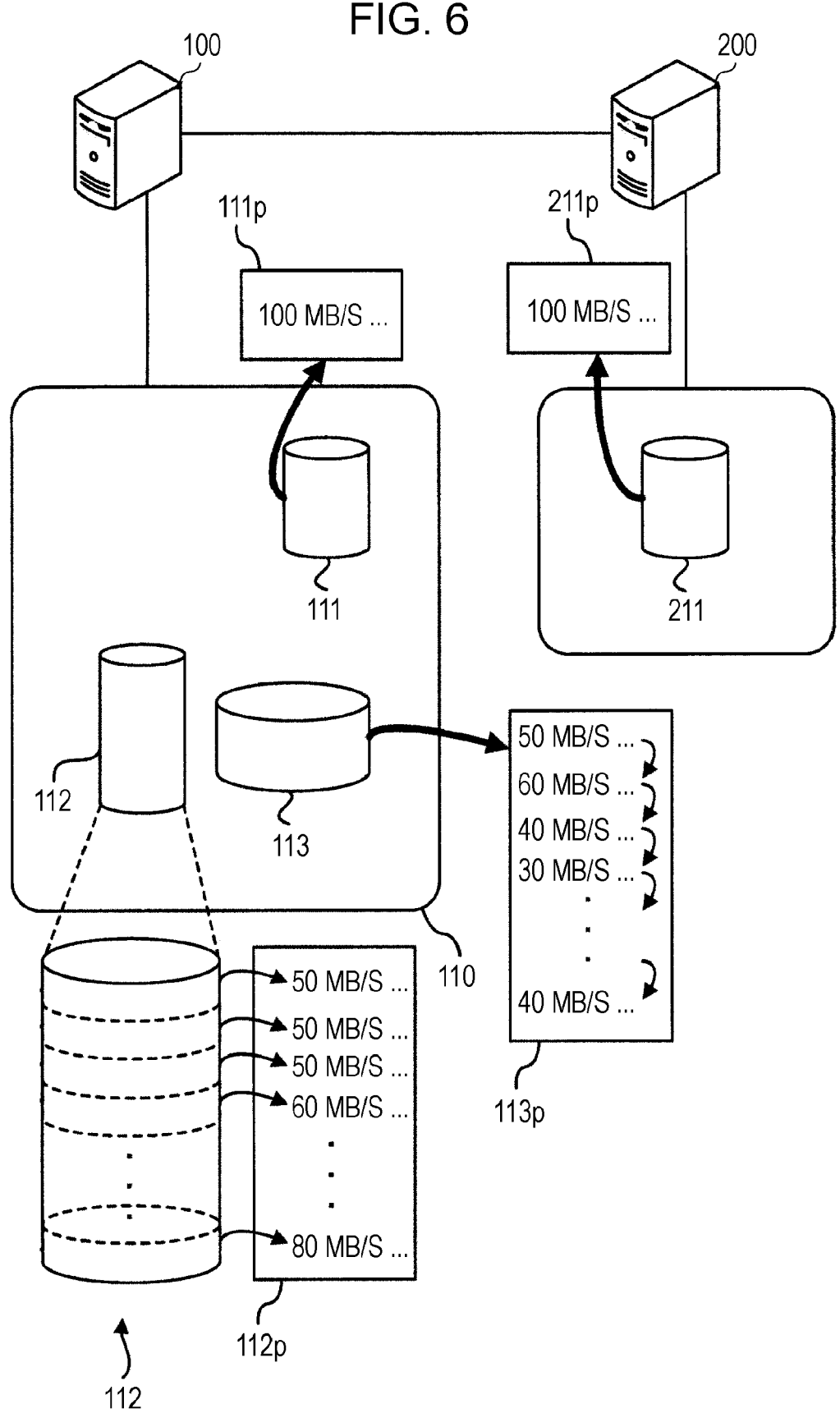
FIG. 6 is a diagram for understanding how to measure patrol performances.

FIG. 6 is a diagram for describing how to measure the patrol performances. Acquisition of the patrol performances by the storage node 100 according to the present embodiment will be described with reference to FIG. 6.

The patrol process according to the present embodiment is executed in order to confirm whether the storage area of the storage apparatus 110 operates normally, that is, whether the storage area of the storage apparatus 110 can be accessed normally. Accordingly, in the patrol process, the storage node according to the present embodiment reads out the data across the entire storage area of the storage apparatus 110 and writes the data.

The patrol performance indicating the processing performance of the patrol process in each storage apparatus is measured in order to control the load of the patrol process on the storage system. The control is based on patrol performance. Each storage node measures the patrol performance of the entire storage area of the storage apparatus or of a specified sub-area in the storage area of the storage apparatus at startup of the storage node or periodically. Each storage node stores the patrol performance resulting from the measurement in the RAM in each storage node (for example, the RAM 102).

First, measurement of an entire patrol performance 111$p$, that is, the patrol performance of the entire storage area of the HDD 111, which includes the storage apparatus 110 managed by the storage node 100, and an entire patrol performance 211$p$, that is, the patrol performance of the entire storage area of the HDD 211, which includes the storage apparatus 210 managed by the storage node 200, will now be described. In this case, the storage node 100 measures the entire patrol performance 111$p$ of the HDD 111, for example, at startup of the storage system. The storage node 200 measures the entire patrol performance 211$p$ of the HDD 211 similarly. The storage nodes 100 and 200 each hold one patrol performance for the HDD 111 and HDD 211, like the entire patrol performance 111$p$ and the entire patrol performance 211$p$. The storage nodes 100 and 200 use the entire patrol performances 111$p$ and 211$p$ to adjust the patrol flow when the storage nodes 100 and 200 execute the patrol process for the HDD 111 and the HDD 211, respectively.

Next, measurement of a subarea-based patrol performance 112$p$, that is, the patrol performance for every subarea resulting from the division of the storage area of the HDD 112, including the storage apparatus 110, will now be described. In this case, the storage node 100 measures the subarea-based patrol performance 112$p$ of the HDD 112, for example, at startup of the storage system. The storage node 100 holds the patrol performance for every subarea of the HDD 112, like the subarea-based patrol performance 112$p$. The storage node 100 uses the subarea-based patrol performance 112$p$ to adjust the patrol flow when the storage node 100 executes the patrol process for each subarea of the HDD 112.

Next, measurement of a time-based patrol performance 113$p$, that is, the patrol performance of the entire HDD 113, which includes the storage apparatus 110 for every time period, will now be described. In this case, the storage node 100 holds the patrol performance of the entire HDD 113 for every time period, like the time-based patrol performance 113$p$. The storage node 100 uses the time-based patrol performance 113$p$ to adjust the patrol flow in the time period in which the storage node 100 executes the patrol process for HDD 113.

Patrol performance tables used in the storage nodes 100, 200, 300, and 400 according to the present embodiment will now be described. FIG. 7 shows an example of the data structure of the patrol performance table in which the measurement results of the patrol performance for every storage apparatus are stored. FIG. 8 shows an example of the data structure of the patrol performance table in which the measurement results of the patrol performance of the storage apparatus for every divided subarea are stored. FIG. 9 shows an example of the data structure of the patrol performance table in which the measurement results of the patrol performance of the storage apparatus for every time period are stored.

The patrol performance tables shown in FIGS. 7 to 9 hold information indicating the patrol performances used for adjusting the patrol flow, which indicates the speed of the patrol process. The patrol performance information indicates the performance characteristics of reading and writing of data of each HDD included in the storage apparatuses 110, 210, 310, and 410. The patrol performance information acquired in the manner shown in FIG. 6 is tabled as patrol performance tables 191, 192, and 193 that are stored in the RAM 102 in the storage node 100 and RAMs (not shown) in the storage nodes 200, 300, and 400.

The measurement results of the entire patrol performance (refer to the entire patrol performance 111p in FIG. 6) which is the patrol performance of each storage apparatus, are stored in the patrol performance table 191 shown in FIG. 7. Columns for an apparatus 191a, a reading process 191e and a writing process 191f by sequential access, and a reading process 191g and a writing process 191h by random access are provided in the patrol performance table 191. In the patrol performance table 191, information items laterally arranged across the columns are associated with each other.

The names of the storage apparatuses allocated to the storage apparatuses 110, 210, 310, and 410 so that they can be identified are stored in the column for the apparatus 191a.

Information indicating the entire patrol performance in the reading process and the writing process by the sequential access in each storage apparatus is stored in the columns for the reading process 191e and the writing process 191f by the sequential access. The patrol performance in the reading process and the writing process by the sequential access is represented by the data transfer speed, that is, the amount of transfer of data per second (Megabyte per second (MB/s)). A larger "MB/s" indicates a higher evaluation value.

Information indicating the entire patrol performance in the reading process and the writing process by the random access in each storage apparatus is stored in the columns for the reading process 191g and the writing process 191h by the random access. The patrol performance in the reading process and the writing process by the random access is represented by the processing power, that is, the count of executions of the writing process and the reading process per second (Inputs-Outputs per Second (IOPS)). A larger "IOPS" indicates a higher evaluation value.

The measurement results of the subarea-based patrol performance (refer to the subarea-based patrol performance 112p in FIG. 6), which is the patrol performance of each divided subarea of the storage apparatus, are stored in the patrol performance table 192 shown in FIG. 8. Columns for an apparatus 192a, a subarea 192b, a reading process 192e and a writing process 192f by the sequential access, and a reading process 192g and a writing process 192h by the random access are provided in the patrol performance table 192. In the patrol performance table 192, information items laterally arranged across the columns are associated with each other.

The names of the storage apparatuses allocated to the storage apparatuses 110, 210, 310, and 410 so that they can be identified are stored in the column for the apparatus 192a, as in the patrol performance table 191.

Information with which the range of each divided subarea of each storage apparatus can be identified is stored in the column for the subarea 192b. For example, when the subarea 192b denotes "0 to 100 [block]" as in the first row of the patrol performance table 192 in FIG. 8, the subarea-based patrol performance of the subarea 0 to 100 [block] of the storage apparatus is stored in the row. The "block" means a data management unit in each HDD. Although it is assumed here that one block is equal to one megabyte, one block is not restricted to this value.

Information indicating the subarea-based patrol performance in the reading process and the writing process by the sequential access in each storage apparatus is stored in the columns for the reading process 192e and the writing process 192f by the sequential access. Information indicating the subarea-based patrol performance in the reading process and the writing process by the random access in each storage apparatus is stored in the columns for the reading process 192g and the writing process 192h by the random access.

The measurement results of the time-based patrol performance (refer to the time-based patrol performance 113p in FIG. 6), which is the patrol performance of each storage apparatus for every time period, are stored in the patrol performance table 193 shown in FIG. 9. Columns for an apparatus 193a, a target time period 193c, a measurement date 193d, a reading process 193e and a writing process 193f by the sequential access, and a reading process 193g and a writing process 193h by the random access are provided in the patrol performance table 193. In the patrol performance table 193, information items laterally arranged across the columns are associated with each other.

The names of the storage apparatuses allocated to the storage apparatuses 110, 210, 310, and 410 so that they can be identified are stored in the column for the apparatus 193a, as in the patrol performance table 191.

Information with which the time period when the time-based patrol performance of each storage apparatus is measured can be identified is stored in the column for the target time period 193c. For example, when the target time period 193c denotes "0 to 3" as in the first row of the patrol performance table 193 in FIG. 9, the patrol performance measured in the time period 0 to 3 is stored in the row.

Information with which the date when the time-based patrol performance of each storage apparatus is measured can be identified is stored in the column for the measurement date 193d. For example, when the measurement date 193d denotes "10/1" as in the first row of the patrol performance table 193 in FIG. 9, the patrol performance in the row means the data measured on October 1st.

Information indicating the time-based patrol performance in the reading process and the writing process by the sequential access in each storage apparatus is stored in the columns for the reading process 193e and the writing process 193f by sequential access. Information indicating the time-based patrol performance in the reading process and the writing process by random access in each storage apparatus is stored in the columns for the reading process 193g and the writing process 193h by the random access.

Figure 11:
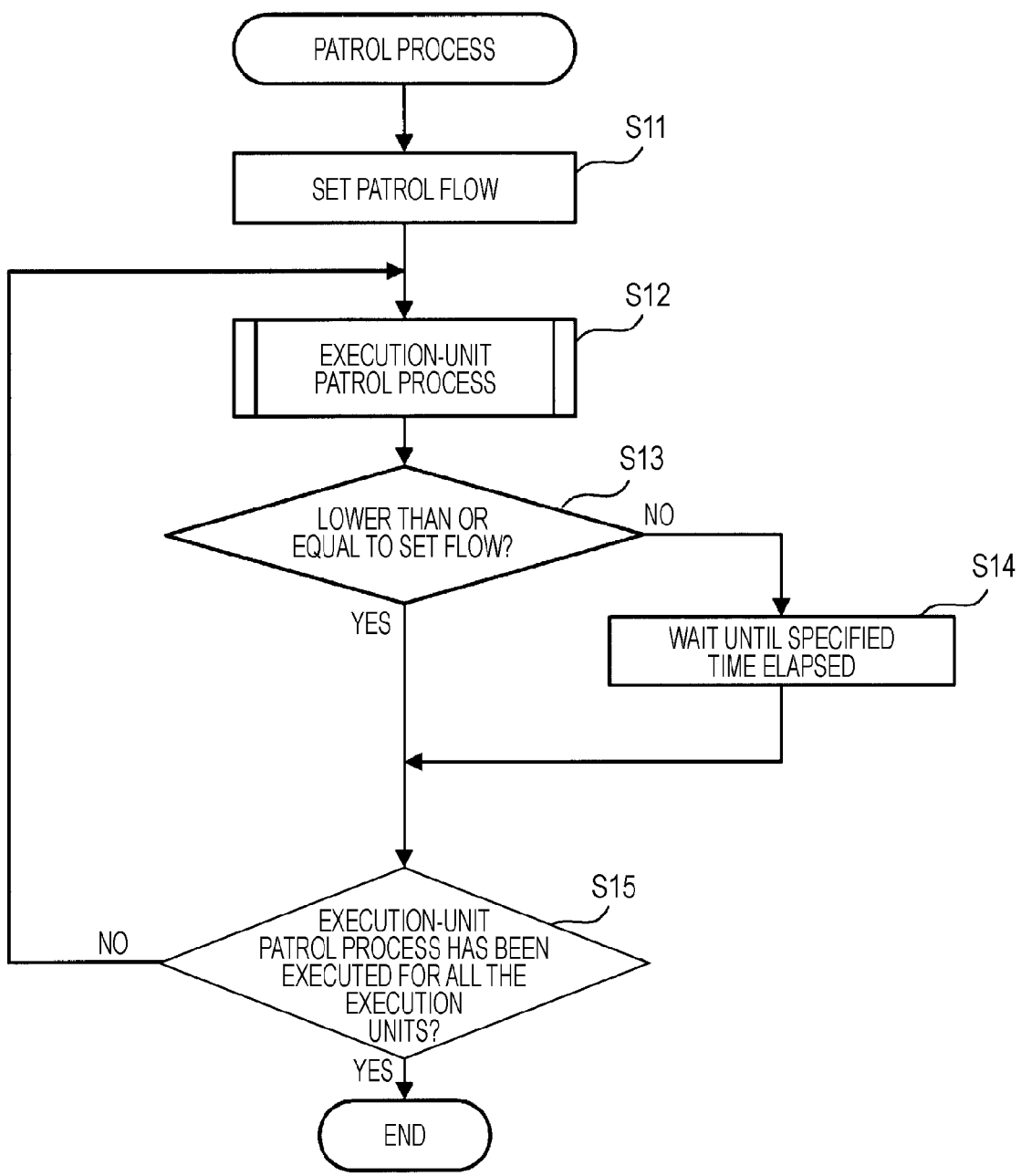
FIG. 11 is a flowchart showing an example of the patrol process.
Figure 14:
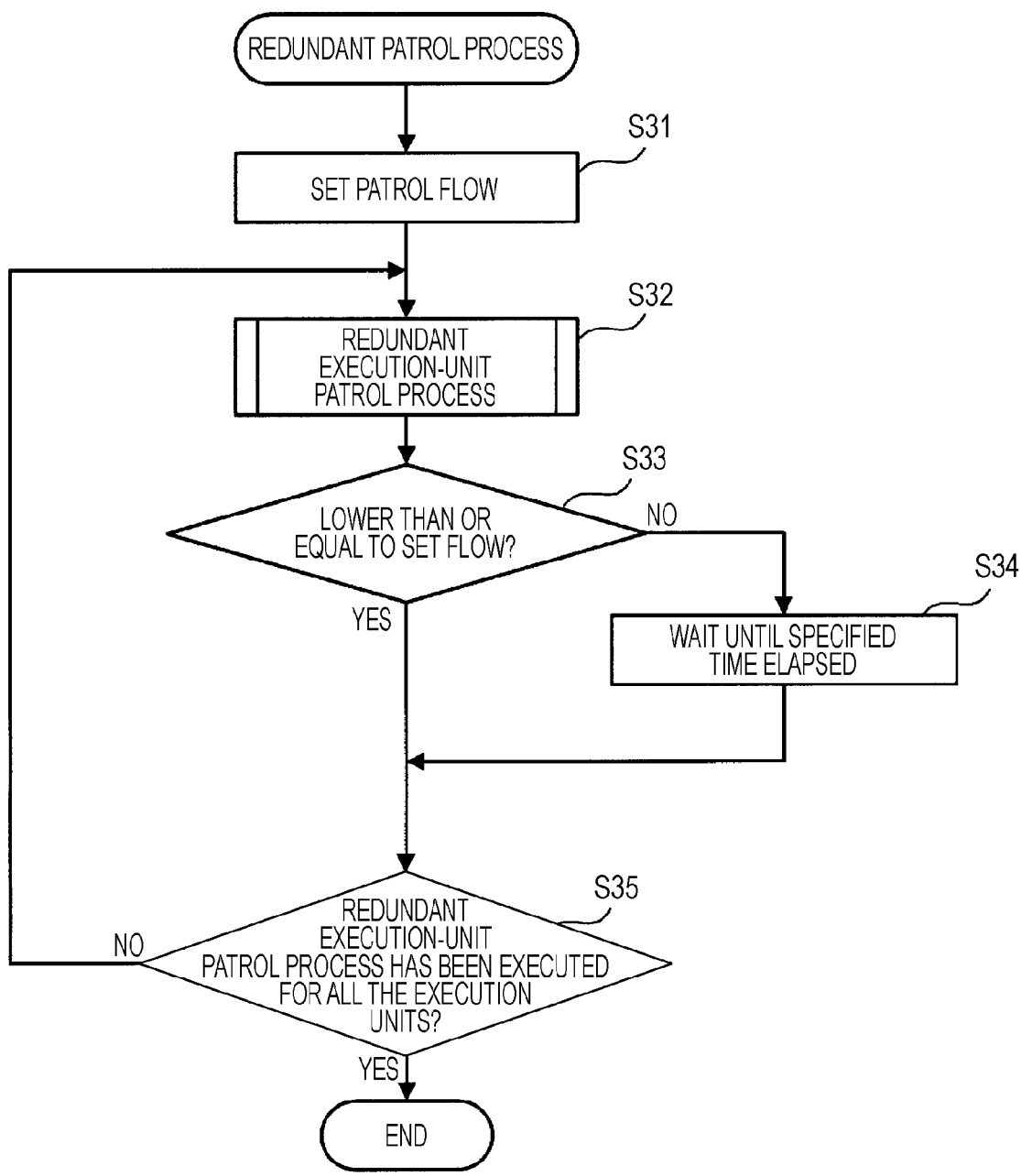
FIG. 14 is a flowchart showing an example of a redundant patrol process.

The storage nodes 100, 200, 300, and 400 collect the patrol performances from the storage apparatuses 110, 210, 310, and 410 with which the storage nodes 100, 200, 300, and 400 are associated, respectively, in the execution of the patrol process shown in FIG. 11 and in the execution of the redundant patrol process shown in FIG. 14, and store the collected patrol performances in the patrol performance tables 191, 192, and 193 in the RAMs provided in the storage nodes 100, 200, 300, and 400.

Another performance, such as a response time, may be used as the patrol performance of each of the storage apparatuses 110, 210, 310, and 410.

The relationship between the patrol performance and the patrol flow will now be described. The storage node 100 determines the patrol flow on the basis of the patrol performances stored in the patrol performance tables 191, 192, and 193 shown in FIGS. 7 to 9, for example, according to any of the policies shown in the following (Example 1) to (Example 3). In the (Example 1) to (Example 3), "Seq-R" denotes reading by sequential access, "Seq-W" denotes writing by sequential access, "Ran-R" denotes reading by random access, and "Ran-W" denotes writing by random access.

EXAMPLE 1

This is a case where "the patrol process is executed as much as possible to the extent that does not affect the access."

When the average access per minute before the patrol process is started is equal to:

| | |
|---|---|
| Seq-R | 10 [MB/s] |
| Seq-W | 0 [MB/s] |
| Ran-R | 100 [IOPS] |

Ran-W 0 [IOPS] and the maximum performance of the storage apparatus 110 is equal to:

| | |
|---|---|
| Seq-R | 50 [MB/s] |
| Seq-W | 50 [MB/s] |
| Ran-R | 500 [IOPS] |

Ran-W 500 [IOPS], reading by sequential access occupies 20% of the maximum performance of the storage apparatus 110, and reading by random access occupies 20% of the maximum performance thereof. Accordingly, 60% of the maximum performance of the storage apparatus 110 can be allocated to the patrol process.

In the patrol process, reading by sequential access is executed in parallel with writing by sequential access. Accordingly, the patrol flow is equal to half of 60% allocatable to reading and writing by sequential access, that is, is equal to 15 [MB/s].

EXAMPLE 2

This is a case where "the patrol process is executed as much as possible to the extent that does not affect access when random access exceeds 50% of the performance and 20% of the performance is allocated to the patrol process when random access does not exceed 50% of the performance."

When the average access per minute before the patrol process is started is equal to:

| | |
|---|---|
| Seq-R | 20 [MB/s] |
| Seq-W | 0 [MB/s] |
| Ran-R | 100 [IOPS] |
| Ran-W | 100 [IOPS], | and the patrol performance value is equal to:

| | |
|---|---|
| Seq-R | 50 [MB/s] |
| Seq-W | 50 [MB/s] |
| Ran-R | 500 [IOPS] |
| Ran-W | 500 [IOPS], | the reading by random access occupies 20% of the patrol performance and writing by random access occupies the 20% of the patrol performance. The sum of the percentages of the reading and the writing by the random access occupies 40% of the maximum performance of the storage apparatus 110. Accordingly, the random access at this time occupies a percent that is not larger than 50% of the maximum performance of the storage apparatus 110.

In the patrol process, reading by sequential access is executed in parallel with writing by sequential access. Accordingly, since 20% of the disk performance is equal to 10 [MB/s], the patrol flow is equal to half of 10 [MB/s], that is, is equal to 5 [MB/s].

EXAMPLE 3

This is a case where "the patrol process is consistently executed at 1 [MB/s] regardless of the access state"

The patrol flow is consistently equal to 1 [MB/s].

Figure 10:
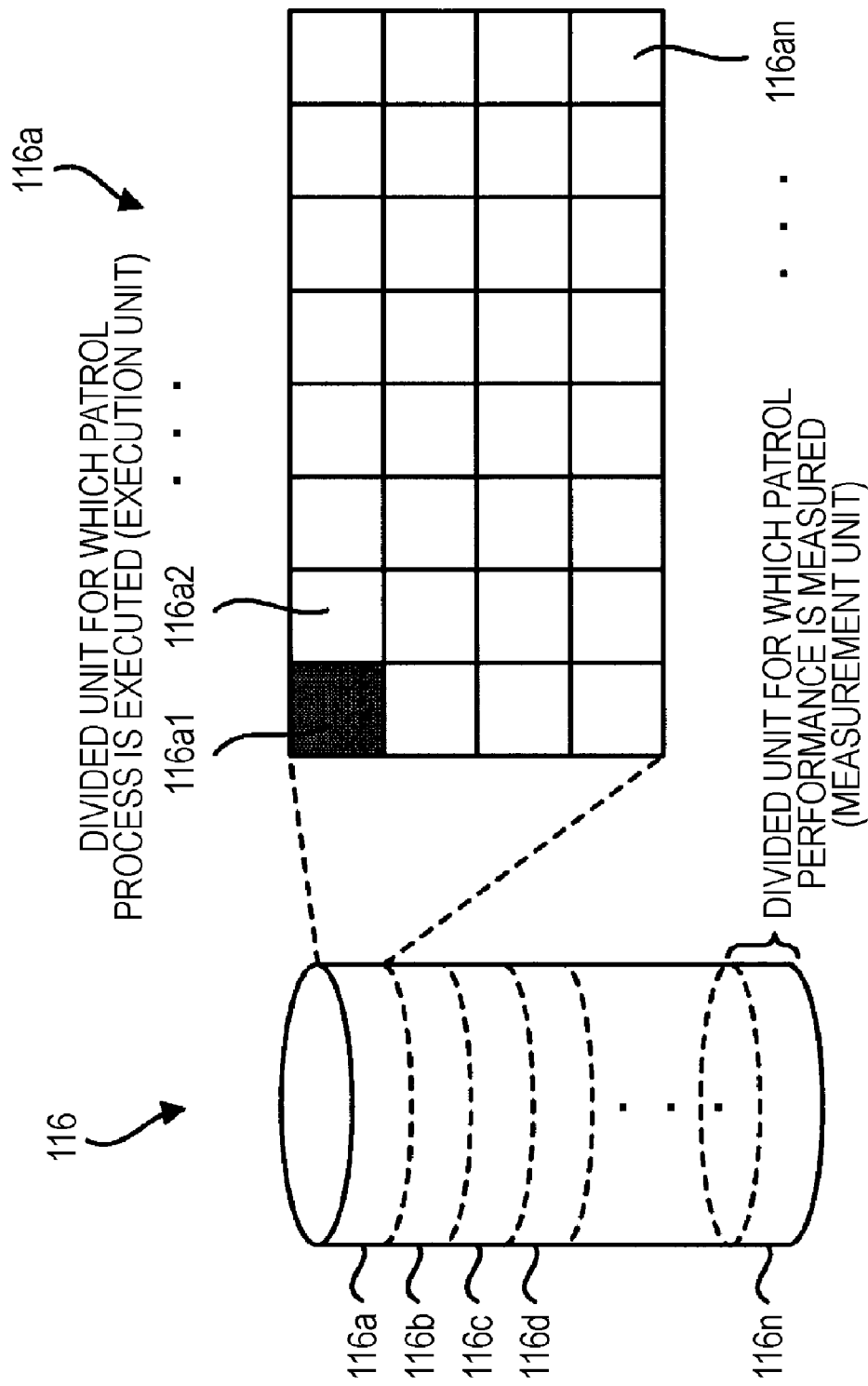
FIG. 10 is a diagram for understanding how to divide the storage area of the storage apparatus in execution of a patrol process.

The relationship between divided units in which the patrol performance is measured and divided units in which the patrol process is executed in the storage area of the storage apparatus will now be described. FIG. 10 is a diagram showing how to divide the storage area of the storage apparatus in the execution of the patrol process. The entire storage area of the storage apparatus 110 is denoted by a storage area 116 in FIG. 10.

The storage area 116 of the storage apparatus 110 shown in FIG. 10 is divided into multiple measurement units 116a, 116b, 116c, 116d, ..., 116n that are the divided units in the measurement of the patrol performance. The subarea-based patrol performance in FIG. 8 is measured in units of the measurement units 116a, 116b, 116c, 116d, ..., 116n.

Each of the measurement units 116a, 116b, 116c, 116d, ..., 116n in the storage area 116 is further divided into multiple execution units 116a1, 116a2, ..., 116an that are divided units in the execution of the patrol process. The patrol process described below with reference to FIG. 11 and the redundant patrol process described below with reference to FIG. 14 are executed in units of the execution units 116a1, 116a2, ..., 116an, to control the patrol flow.

Processes executed in the storage node according to the present embodiment will now be described. First, the patrol process executed in the storage node according to the present embodiment will be described. FIG. 11 is a flowchart showing an example of the patrol process.

The storage node 100 according to the present embodiment starts to execute the patrol process, for example, at startup of the storage system, at startup of the storage node or the storage apparatus, or at predetermined intervals. The patrol process is executed to check whether any failure occurs in the storage area of the storage apparatus.

A case where the storage node 100 executes the patrol process for the storage apparatus 110 will be described with reference to FIG. 11. It is assumed here that the patrol is executed for the entire storage area of the storage apparatus 110 at startup of the storage node 100. At startup of the storage node 100, the storage node 100 invokes the patrol process to execute the patrol process for diagnosing normal readout and writing of data from and into the entire storage area of the storage apparatus 110.

In Step S11, the storage node 100 sets the patrol flow. The patrol flow (refer to FIG. 6) is a condition used to adjust the speed of the patrol process, as described above. The storage node 100 can use the entire patrol performance (for example, the entire patrol performances 111p and 211p in FIG. 6), the subarea-based patrol performance (for example, the subarea-based patrol performance 112p in FIG. 6), or the time-based patrol performance (for example, the time-based patrol performance 113p in FIG. 6) as the patrol performance. For example, the manager of the storage system sets in advance the patrol performance that is used by the storage node 100 for each storage apparatus in accordance with the hardware characteristic of each storage apparatus and the usage thereof.

For example, the subarea-based patrol performance indicating the patrol performance of each subarea is used for the storage apparatus in which the patrol performance is greatly varied for every subarea. The time-based patrol performance indicating the patrol performance of each time period is used for the storage apparatus in which the usage is varied for every time period. The entire patrol performance is used for the storage apparatus in which the patrol performance is not varied. The storage node 100 measures the patrol performances in advance and acquires the patrol performance of each HDD included in the target storage apparatus in the execution of the patrol process. The storage node 100, then, sets the acquired patrol performance as the patrol flow of each HDD in the storage apparatus.

In Step S12, the storage node 100 executes an execution-unit patrol process to patrol the storage apparatus 110 for every execution unit of the storage area of the storage apparatus 110. The execution-unit patrol process will be described in detail below with reference to FIG. 12. The storage node 100 acquires time information used as the reference time of a specified time described below at start of the execution of the execution-unit patrol process.

In Step S13, the storage node 100 determines whether the patrol is executed at a patrol flow that does not exceed the patrol flow set in Step S11. If the patrol is executed at a patrol flow exceeding the set patrol flow, the storage node 100 proceeds to Step S14. If the patrol is executed at a patrol flow that does not exceed the set patrol flow, the storage node 100 proceeds to Step S15.

Specifically, the storage node 100 determines in Step S13 whether the time interval of the patrol process for every execution unit (refer to FIG. 10) is shorter than or equal to a specified time that is set.

The specified time is a value used to control the time interval of the patrol process for every execution unit so as to be longer than or equal to a predetermined time in order to adjust the load of the patrol process on the storage system. The specified time is used to increase the patrol flow (to ease the restriction on the speed of the patrol process) if the patrol performance of the HDD is high and is used to decrease the patrol flow (to tighten the restriction on the speed of the patrol process) if the patrol performance of the HDD is low.

The specified time is calculated according to the following relational expression in the present embodiment:

[Formula 1]

$$\text{Specified time [s]} = \text{Execution unit [MB]}/\text{Patrol performance [MB/s]} \quad (1)$$

Specifically, when the entire patrol performance of a certain HDD is equal to 10 [MB/s] and the execution unit of the HDD is 1 [MB], the specified time is equal to 0.1 [s] (1 [MB]/10 [MB/s]=0.1 [s]).

The storage node 100 according to the present embodiment calculates the specified time in the above manner. The storage node 100 determines that the patrol flow does not exceed the set patrol flow if the specified time elapsed since the start time of the most recent execution-unit patrol process (S12) and determines that the patrol flow exceeds the set patrol flow if the specified time does not elapse since the start time of the most recent execution-unit patrol process.

In Step S14, the storage node 100 waits until the specified time since the start time of the most recent execution-unit patrol process elapses. The storage node 100 proceeds to Step S15 after the specified time has elapsed.

Specifically, the storage node 100 waits in Step S14 until a predetermined time (for example, 0.1 seconds) has elapsed since the most recent execution-unit patrol process is finished.

In Step S15, the storage node 100 determines whether the execution-unit patrol process in Step S12 has been executed for all the execution units of the storage apparatus 110. The storage node 100 goes back to Step S12 if the execution-unit patrol process in Step S12 has not been executed for all the execution units of the storage apparatus 110. The storage node 100 terminates the patrol process if the execution-unit patrol process in Step S12 has been executed for all the execution units of the storage apparatus 110.

Figure 12:
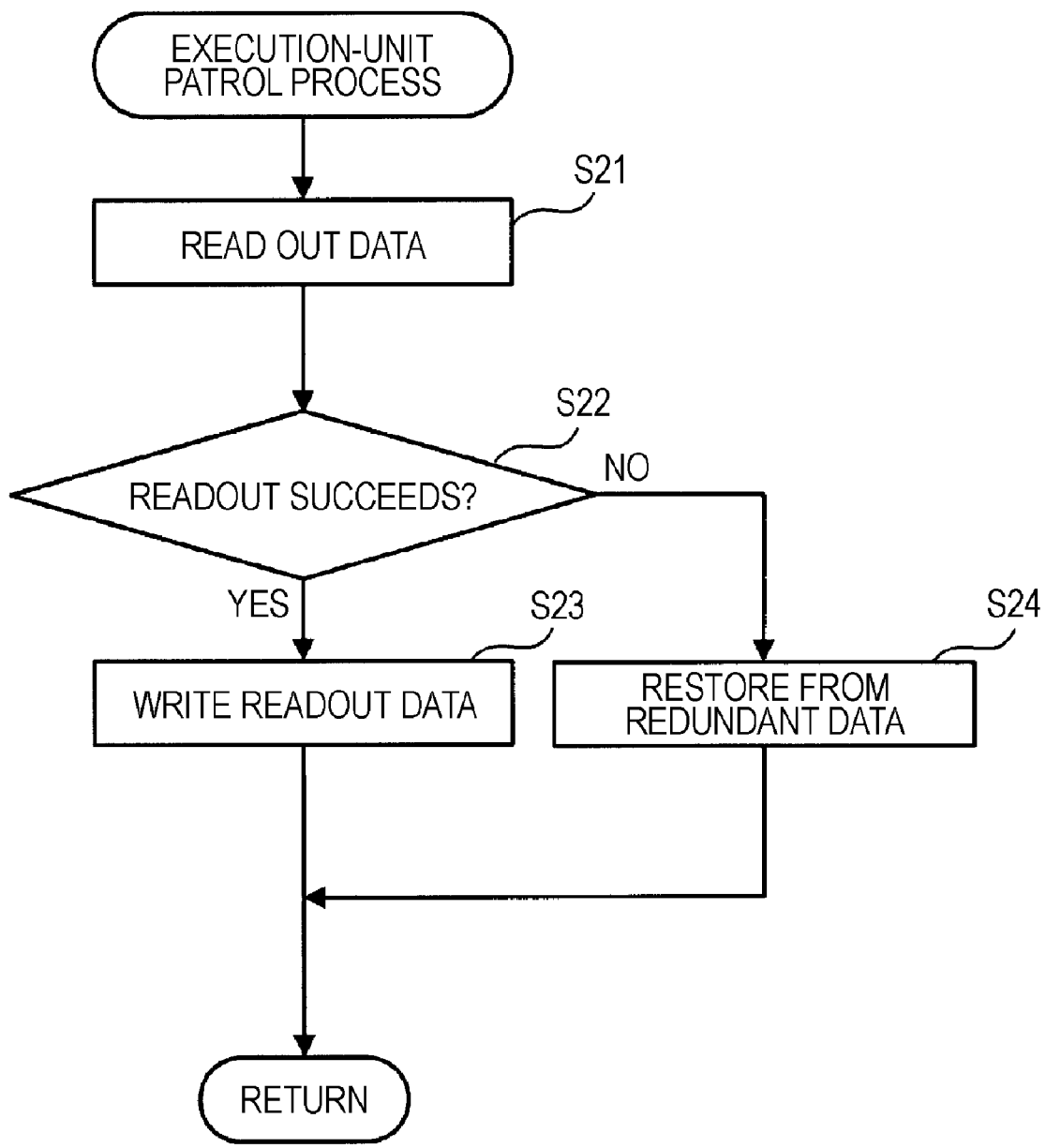
FIG. 12 is a flowchart showing an example of an execution-unit patrol process.

The execution-unit patrol process in Step S12 in the patrol process (refer to FIG. 11) will now be described in detail. FIG. 12 is a flowchart showing an example of the execution-unit patrol process. It is assumed here that the patrol is executed for the entire storage area of the storage apparatus 110 at startup of the storage node 100, as in the patrol process in FIG. 11.

In Step S21, the storage node 100 reads out data stored in the execution unit that is currently patrolled in the storage area of the storage apparatus 110.

In Step S22, the storage node 100 determines whether the readout in Step S21 is successful. If the readout succeeds, the storage node 100 proceeds to Step S23. If the readout fails, the storage node 100 proceeds to Step S24.

In Step S23, the storage node 100 writes the data read out in Step S21 into the subarea from which the data has been read out in Step S21. Then, the storage node 100 terminates the execution-unit patrol process and returns to the patrol process.

In Step S24, the storage node 100 reads out the redundant data corresponding to the data read out in Step S21 from the storage apparatus in which the redundant data is stored and writes the readout redundant data into the subarea from which the data has been read out in Step S21. Then, the storage node 100 terminates the execution-unit patrol process and returns to the patrol process.

The storage node 100 according to the present embodiment executes the patrol process to confirm whether the storage area of the storage apparatus 110 operates normally, that is, whether data can be read out normally from and written into the storage area of the storage apparatus 110 in the above manner. In addition, the storage node 100 autonomously adjusts and executes the patrol process to control the load of the patrol process on the storage system. As a result, it is possible to increase the reliability of the storage system while reducing the effect of the load based on the execution of the patrol process on access to the storage apparatus.

The redundant patrol process executed by the storage node 100 according to the present embodiment will now be described. The storage node 100 according to the present embodiment executes the redundant patrol process, in addition to the patrol process described above. The redundant patrol process is executed to confirm consistency between the data stored in the storage apparatus 110 and the redundant data corresponding to the data when the redundant data having the same content as that of the data stored in the storage apparatus 110 is stored in another storage apparatus (for example, the storage apparatus 210) duplexed (mirrored) with the storage apparatus 110 in order to back up the data stored in the storage apparatus 110.

The storage node 100 according to the present embodiment executes the redundant patrol process at startup of the storage node 100 and periodically thereafter. The redundant patrol process is executed on the basis of a redundant patrol performance to adjust the load on the storage system.

Measurement of the redundant patrol performance according to the present embodiment will now be described.

Figure 13:
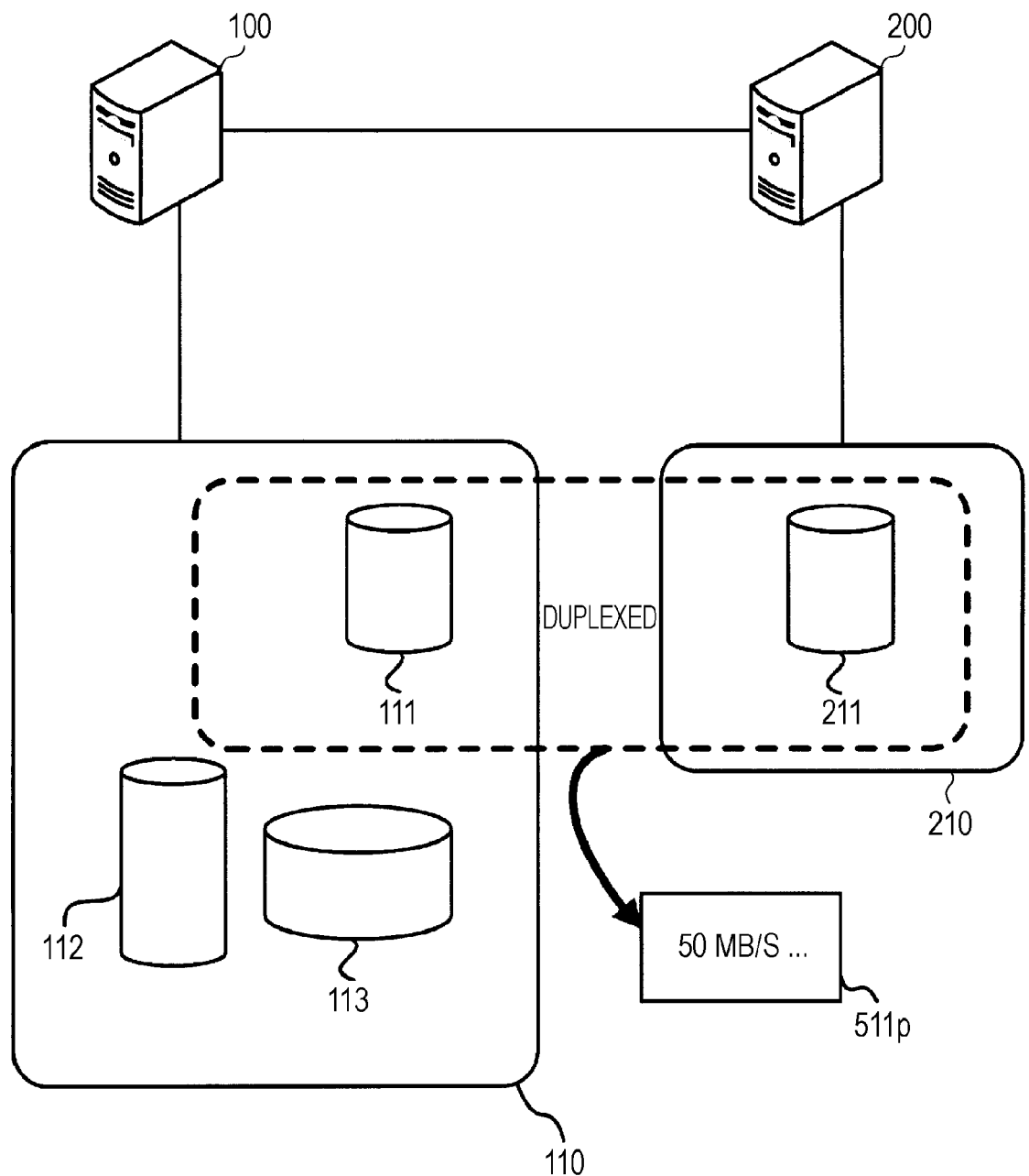
FIG. 13 is a diagram for understanding how to measure a redundant patrol performance.

FIG. 13 is a diagram for understanding how to measure the redundant patrol performance. Acquisition of the redundant patrol performance by the storage node 100 according to the present embodiment will be described with reference to FIG. 13.

The redundant patrol process according to the present embodiment is executed in order to confirm whether the data stored in the storage area of the storage apparatus 110 is consistent with the corresponding redundant data, that is, whether the data stored in the storage area of the storage apparatus 110 is normally backed up by the storage apparatus duplexed with the storage apparatus 110. Accordingly, the storage node according to the present embodiment reads out the data across the entire storage area of the storage apparatus 110 and writes the data in the redundant patrol process.

The redundant patrol performance indicating the processing performance of the redundant patrol process is measured in order to control the load of the redundant patrol process on the storage system, as in the patrol process. The control is based on the redundant patrol performance. Since the redundant patrol process should be executed in cooperation between the storage nodes managing the storage apparatuses forming the redundant configuration, the redundant patrol performance, which is a value that takes into consideration the redundant configuration between the nodes as the patrol performance, is measured and the measured, redundant patrol performance is used to adjust the speed of the redundant patrol process (a redundant patrol flow).

Each storage node measures the redundant patrol performance of the entire storage area of the storage apparatus or of a specified area in the storage area of the storage apparatus, in cooperation with the storage node managing another storage apparatus duplexed (mirrored) with the storage apparatus at startup of the storage node or periodically thereafter. Each storage node stores the redundant patrol performance resulting from the measurement in the RAM in each storage node (for example, the RAM 102).

FIG. 13 illustrates how to measure a redundant patrol performance $511p$ when the HDD 111 in the storage apparatus 110 managed by the storage node 100 and the HDD 211 in the storage apparatus 210 managed by the storage node 200 form a duplexed (mirrored) configuration (RAID1). In this case, the storage nodes 100 and 200 hold one redundant patrol performance, such as the redundant patrol performance $511p$, for every pair of two HDDs, such as the HDDs 111 and 211.

The redundant patrol process executed by the storage node according to the present embodiment will now be described. The redundant patrol process is executed to check the consistency between data stored in the storage apparatus and the redundant data stored in another storage apparatus with which the storage apparatus forms the redundant configuration. FIG. 14 is a flowchart showing an example of the redundant patrol process.

A case where the storage node 100 executes the redundant patrol for the storage apparatus 110 and the storage apparatus 210 with which the storage apparatus 110 forms the redundant configuration in cooperation with the storage node 200 will now be described with reference to FIG. 14. Although the redundant patrol process is executed on the initiative of the storage node (for example, the storage node 100) managing one storage apparatus (for example, the storage apparatus 110) among the duplexed (mirrored) storage apparatuses, the redundant patrol process is advanced in cooperation with the storage node (for example, the storage node 200) managing the other storage apparatus (for example, the storage apparatus 210). It is assumed here that the patrol is executed for the entire storage area of the storage apparatus 110 and the entire storage area of the storage apparatus 210 associated with the storage apparatus 110 in the redundant configuration after the patrol process is executed at startup of the storage node 100.

After the patrol process is executed at startup of the storage node 100, the storage node 100 invokes the redundant patrol process to execute the redundant patrol process for diagnosing the consistency between the data in the entire storage area of the storage apparatus 110 and the data in the storage apparatus 210 associated with the storage apparatus 110 in the redundant configuration.

Referring to FIG. 14, in Step S31, the storage node 100 sets the redundant patrol flow (refer to FIG. 13) corresponding to the pair of the duplexed HDDs for which the patrol process is executed.

In Step S32, the storage node 100 patrols the storage apparatus 110 for every execution unit of the storage area of the storage apparatus 110, and receives the result of the patrol of the storage apparatus 210 by the storage node managing the storage apparatus 210 to execute a redundant execution-unit patrol process for checking the consistency between the data in the storage apparatus 110 and the data in the storage apparatus 210. The redundant execution-unit patrol process will be described in detail below with reference to FIG. 15. The storage node 100 acquires time information used as the reference time of a specified time described below at the start of execution of the redundant execution-unit patrol process.

In Step S33, the storage node 100 determines whether the redundant patrol is executed at a patrol flow that does not exceed the patrol flow set in Step S31, as in Step S13 in the patrol process. If the redundant patrol is executed at a patrol flow exceeding the set patrol flow, the storage node 100 proceeds to Step S34. If the patrol is executed at a patrol flow that does not exceed the set patrol flow, the storage node 100 proceeds to Step S35.

In Step S34, the storage node 100 waits until the specified time has elapsed after the start time of the most recent redundant execution-unit patrol process (Step S32). The storage node 100 proceeds to Step S35 after the specified time has elapsed.

In Step S35, the storage node 100 determines whether the redundant execution-unit patrol process in Step S32 has been executed for all the execution units of the storage apparatus 110. If the redundant execution-unit patrol process in Step S32 has not been executed for all the execution units of the storage apparatus 110, the storage node 100 goes back to Step S32. If the redundant execution-unit patrol process in Step S32 has been executed for all the execution units of the storage apparatus 110, the storage node 100 terminates the redundant patrol process.

Figure 15:
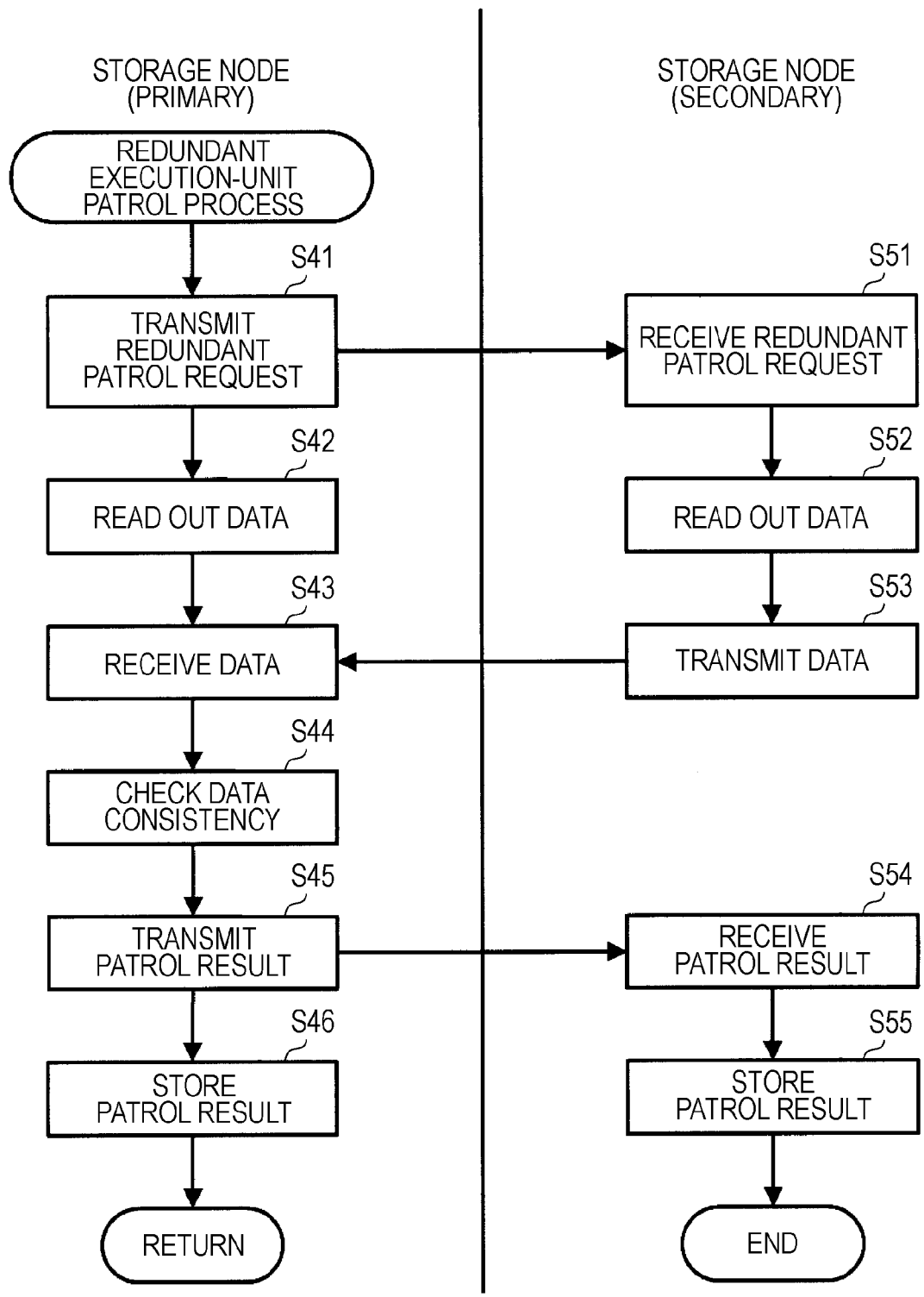
FIG. 15 is a sequence chart showing an example of a redundant execution-unit patrol process.

The redundant execution-unit patrol process in Step S32 in the redundant patrol process (refer to FIG. 14) will now be described in detail. FIG. 15 is a sequence chart showing an example of the redundant execution-unit patrol process. It is assumed here that the patrol is executed for the entire storage area of the storage apparatus 110 and the entire storage area of the storage apparatus 210 associated with the storage apparatus 110 in the redundant configuration after the patrol process is executed at startup of the storage node 100.

In Step S41, the storage node 100 transmits a redundant patrol request to request start of the redundant patrol process for the storage apparatus 210 to the storage node 200 managing the storage apparatus 210 associated with the storage apparatus 110 in the redundant configuration. The storage node 100 concurrently transmits information used for identifying the execution unit of the storage apparatus 210 for which the redundant patrol process is executed to the storage node 200.

In Step S42, the storage node 100 reads out the data stored in the execution unit that is currently patrolled in the storage area of the storage apparatus 110.

In Step S43, the storage node 100 receives the redundant data stored in the storage apparatus 210 from the storage node 200.

In Step S44, the storage node 100 checks for consistency between the data read out in Step S42 and the data received in Step S43.

In Step S45, the storage node 100 transmits the result of the check for consistency in Step S44 to the storage node 200.

In Step S46, the storage node 100 stores the result of the check for consistency in Step S44 in the RAM 102 in the storage node. Then, the storage node 100 terminates the redundant execution-unit patrol process and returns to the redundant patrol process.

In Step S51, the storage node 200 receives the redundant patrol request transmitted from the storage node 100 in Step S41. The storage node 200 concurrently identifies the execution unit of the storage apparatus 210 for which the redundant patrol process is executed from the transmitted information.

In Step S52, the storage node 200 reads out the data stored in the execution unit identified in Step S51 in the storage area of the storage apparatus 210. The readout data is the redundant data of the data which is stored in the storage apparatus 110 and for which the redundant patrol process is executed.

In Step S53, the storage node 200 transmits the redundant data read out from the storage apparatus 210 in Step S52 to the storage node 100.

In Step S54, the storage node 200 receives the result of the check for consistency transmitted from the storage node 100 in Step S45.

In Step S55, the storage node 200 stores the result of the check of the consistency received in Step S54 in the RAM (not shown) in the storage node 200. Then, the storage node 200 terminates the redundant execution-unit patrol process.

The storage node according to the present embodiment can execute the redundant patrol process in the above manner to determine whether the data in each storage node correctly holds the redundant configuration when the redundant configuration is formed between the storage nodes.

Although the storage management apparatus, the storage management program, and the storage system according to the embodiments of the present invention have been described, the above description only indicates the principle of the present invention. It should be understood by those skilled in the art that various modifications, combinations, sub-combinations, and alterations may occur depending on design requirements and other factors insofar as they are within the scope of the appended claims or the equivalents thereof. In addition, other arbitrary components or processes may be added to the embodiments of the present invention. The present invention may be embodied by any combination of two or more arbitrary components (features) in the embodiments of the present invention described above.

The processing functions described above can be realized by a computer. In this case, programs describing the processing content of the functions of the storage nodes 100, 200, 300, and 400, the management node 30, the terminal apparatuses 21, 22, and 23, the control node 500, and the access node 600 are provided. The computer executes the programs to realize the above functions.

The programs describing the processing content can be recorded in a computer-readable recording medium. The computer-readable recording medium is, for example, a magnetic recording device, an optical disk, a magneto-optical recording medium, or a semiconductor memory. The magnetic recording device is, for example, an HDD, a flexible disk (FD), or a magnetic tape (MT). The optical disk is, for example, a digital versatile disk (DVD), a DVD-RAM, a compact disk-read only memory (CD-ROM), a compact disk-recordable (CD-R), or a compact-disk-rewritable (CD-RW). The magneto-optical recording medium is, for example, a magneto-optical disk (MO).

In order to distribute the above programs, for example, a portable recording medium, such as a DVD or a CD-ROM, on which the programs are recorded can be sold. The programs may be stored in a server computer and may be transferred from the server computer to another computer over a network.

The computer executing the above programs stores the programs recorded on the portable recording medium or transferred from the server computer into its own storage device. The computer reads out the programs from its own storage device to execute the processing in accordance with the programs. The computer may directly read out the programs from the portable recording medium to execute the processing in accordance with the programs. Alternatively, the computer may sequentially execute the processing in accordance with a program that is received each time the program is transferred from the server computer.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A storage management apparatus managing a plurality of storage apparatuses connected to each other over a network in a storage system that distributes data among the storage apparatuses and stores the data therein, the storage management apparatus comprising:
   a patrol performance measuring unit configured to measure a patrol performance indicating a processing performance of a reading process and a writing process in the storage apparatuses, and to determine a patrol flow setting value based on the patrol performance measured;
   a patrol process executing unit configured to execute a patrol process to confirm whether a storage area of each storage apparatus operates normally; and
   a patrol flow controlling unit configured to control a patrol flow to be less than the patrol flow setting value determined by the patrol performance measuring unit, the patrol flow indicating the speed of the patrol process executed by the patrol process executing unit.

2. The storage management apparatus according to claim 1, further comprising:
   a management information storage unit configured to store management information used for associating each storage apparatus with a mirrored storage apparatus storing redundant data having the same content as that of the data stored in the storage apparatus,
   wherein, in the patrol process, the patrol process executing unit refers to the management information stored in the management information storage unit to read out the data stored in the storage apparatus and the redundant data that has the same content as that of the data stored in the storage apparatus and that is stored in the mirrored storage apparatus, and compares the readout data with the redundant data to confirm whether the data is consistent with the redundant data.

3. The storage management apparatus according to claim 1,
   wherein the patrol performance measuring unit measures the patrol performance for every measurement unit area resulting from division of the storage area of the storage apparatus,
   wherein the patrol process executing unit executes the patrol process for every execution unit area resulting from division of each measurement unit area in the storage area of the storage apparatus, and wherein the patrol flow controlling unit controls the patrol flow of the patrol process for every execution unit area.

4. The storage management apparatus according to claim 1, further comprising:

a time information acquiring unit configured to acquire time information indicating the current time, wherein the patrol performance measuring unit holds patrol performances that are measured for every time period to which the time indicated by the time information acquired by the time information acquiring unit belongs, and wherein the patrol flow controlling unit selects the patrol performance corresponding to the time period to which the current time belongs from the patrol performances held by the patrol performance measuring unit on the basis of the current time indicated by the time information acquired by the time information acquiring unit, determines the patrol flow setting value on the basis of the selected patrol performance, and controls the patrol flow so as not to exceed the determined patrol flow setting value.

5. The storage management apparatus according to claim 1, further comprising:

a management information storage unit configured to store management information used for associating each storage apparatus with a mirrored storage apparatus storing redundant data having the same content as that of the data stored in the storage apparatus, wherein, in the patrol process, the patrol process executing unit refers to the management information stored in the management information storage unit to read out the redundant data that has the same content as that of the data stored in the storage apparatus and that is stored in the mirrored storage apparatus and overwrites the read-out redundant data on the storage area of the data in the storage apparatus.

6. A storage medium storing a computer-readable storage management program to execute a management process for a plurality of storage apparatuses in a storage system that distributes data among the storage apparatuses connected to each other over a network and stores the data therein, the management process comprising:

measuring a patrol performance indicating a processing performance of a reading process and a writing process in the storage apparatuses, and determining a patrol flow setting value based on the patrol performance measured;

executing a patrol process to confirm whether a storage area of each storage apparatus normally operates; and controlling a patrol flow to be less than the determined patrol flow setting value, the patrol flow indicating the speed of the patrol process.

7. A storage system comprising:

a plurality of storage apparatuses connected to each other over a network;

a storage management apparatus configured to distribute data among the storage apparatuses and store the data therein and to manage the storage apparatuses; and a management information storage unit configured to store management information used for associating each storage apparatus with a mirrored storage apparatus storing redundant data having the same content as that of the data stored in the storage apparatus, wherein the storage management apparatus includes a patrol performance measuring unit measuring a patrol performance indicating a processing performance of a reading process and a writing process in the storage apparatuses, and determining a patrol flow setting value based on the patrol performance measured;

a patrol process executing unit executing a patrol process to confirm whether a storage area of each storage apparatus normally operates; and a patrol flow controlling unit controlling a patrol flow to be less than the patrol flow setting value determined by the patrol performance measuring unit, the patrol flow indicating the speed of the patrol process executed by the patrol process executing unit, and wherein, in the patrol process, the patrol process executing unit refers to the management information stored in the management information storage unit to read out the data stored in the storage apparatus and the redundant data that has the same content as that of the data stored in the storage apparatus and that is stored in the mirrored storage apparatus, and compares the readout data with the redundant data to confirm whether the data is consistent with the redundant data.

* * * * *